US010875993B2

(12) United States Patent
Gahleitner et al.

(10) Patent No.: US 10,875,993 B2
(45) Date of Patent: Dec. 29, 2020

(54) POLYPROPYLENE COMPOSITION

(71) Applicant: BOREALIS AG, Vienna (AT)

(72) Inventors: Markus Gahleitner, Linz (AT); Jingbo Wang, Linz (AT); Klaus Bernreitner, Linz (AT); Peter Niedersuss, Linz (AT)

(73) Assignee: BOREALIS AG ( * ) Notice: Subject to any disclaimer, the term of this patent is extended or adjusted under 35 U.S.C. 154(b) by 0 days.

(21) Appl. No.: 16/641,945

(22) PCT Filed: Aug. 30, 2018

(86) PCT No.: PCT/EP2018/073308
§ 371 (c)(1),
(2) Date: Feb. 25, 2020

(87) PCT Pub. No.: WO2019/052820
PCT Pub. Date: Mar. 21, 2019

(65) Prior Publication Data
US 2020/0317895 A1 Oct. 8, 2020

(30) Foreign Application Priority Data
Sep. 13, 2017 (EP) .................................. EP17190820

(51) Int. Cl.
C08L 23/12 (2006.01)
(52) U.S. Cl.
CPC ......... C08L 23/12 (2013.01); C08L 2205/025 (2013.01); C08L 2205/035 (2013.01); C08L 2207/02 (2013.01); C08L 2314/02 (2013.01); C08L 2314/06 (2013.01)
(58) Field of Classification Search
CPC ............... C08L 23/12; C08L 2205/025; C08L 2205/035; C08L 2314/02; C08L 2314/06
See application file for complete search history.

(56) References Cited

U.S. PATENT DOCUMENTS

| 2010/0021666 A1* | 1/2010 | De Palo et al. | ........ | F16L 11/04 428/36.91 |
| 2013/0309431 A1* | 11/2013 | Bergstra et al. | ...... | C08F 210/06 428/36.9 |

FOREIGN PATENT DOCUMENTS

| CN | 101675104 A | 3/2010 |
| EA | 011587 B1 | 4/2009 |
| EP | 0202284 A1 | 11/1986 |
| EP | 0887379 A1 | 12/1998 |
| EP | 0887380 A1 | 12/1998 |
| EP | 0887381 A1 | 12/1998 |
| EP | 0991684 B1 | 1/2006 |
| EP | 1661935 A1 | 5/2006 |
| EP | 2022824 A1 | 2/2009 |
| EP | 2610271 A1 | 7/2013 |
| EP | 2610272 A1 | 7/2013 |
| EP | 2585527 B1 | 1/2015 |
| KR | 20160041979 A2 | 4/2016 |
| RU | 2443729 C2 | 2/2012 |
| RU | 2510407 C2 | 3/2014 |
| RU | 2567546 C2 | 11/2015 |
| WO | 92/12182 A1 | 7/1992 |
| WO | 99/24478 A1 | 5/1999 |
| WO | 99/24479 A1 | 5/1999 |
| WO | 00/68315 A1 | 11/2000 |
| WO | 2002/02576 A1 | 1/2002 |
| WO | 2003/000754 A1 | 1/2003 |
| WO | 2003/000757 A1 | 1/2003 |
| WO | 2004/000899 A1 | 12/2003 |
| WO | 2004/029112 A1 | 4/2004 |
| WO | 2004/055101 A1 | 7/2004 |
| WO | 2007/116034 A1 | 10/2007 |
| WO | 2007/137853 A1 | 12/2007 |
| WO | 2008/077773 A1 | 7/2008 |
| WO | 2010/052260 A1 | 5/2010 |
| WO | 2010/052263 A1 | 5/2010 |
| WO | 2010/052264 A1 | 5/2010 |
| WO | 2011/076780 A1 | 6/2011 |
| WO | 2011/135004 A2 | 11/2011 |
| WO | 2011/160953 A1 | 12/2011 |
| WO | 2011160953 A1 | 12/2011 |
| WO | 2012/001052 A2 | 1/2012 |
| WO | 2012/007430 A1 | 1/2012 |
| WO | 2012/084961 A1 | 6/2012 |
| WO | 2013/007650 A1 | 1/2013 |
| WO | 2015/158790 A1 | 10/2015 |
| WO | 2015/197354 A2 | 12/2015 |

OTHER PUBLICATIONS

Korean Office Action dated Apr. 16, 2020.
Busico, et al., "Alk-1-ene Polymerization in the Presence of a Monocyclopentadienyl Zirconium(IV) Acetamidinate Catalyst: Microstructural and Mechanistic Insightsa", Macromol Rapid Commun. 2007, 28, 1128-1134.
Castignolles et al., "Detection and quantification of branching in polyacrylates by size-exclusion chromatography (SEC) and melt-state 13C NMR spectroscopy", Polymer 50 (2009) 2373-2383.
H. N. Cheng, "13C NMR Analysis of Ethylene-Propylene Rubbers", Macromolecules 1984, 17, 1950-1955.
Extended European Search Report for Application No. 17190820.5-1102, dated Mar. 12, 2018.
Flip et al., "Heteronuclear decoupling under fast MAS by a rotor-synchronized Hahn-echo pulse train", Journal of Magnetic Resonance 176 (2005) 239-243.
Gahleitner, et al., "Heterophasic Copolymers of Polypropylene: Development, Design Principles, and Future Challenges", J. Appl. Polym. Sci. 2013, pp. 3028-3037.

(Continued)

Primary Examiner — Nathan M Nutter
(74) Attorney, Agent, or Firm — Tarolli, Sundheim, Covell & Tummino LLP

(57) ABSTRACT

New polypropylene composition which provides an excellent balance between mechanical properties, optical behaviour and low amounts of extractable substances combined with good retortability.

13 Claims, No Drawings

(56) References Cited

OTHER PUBLICATIONS

Griffin, et al., Low-load rotor-synchronised Hahn-echo pulse train (RS-HEPT) 1H decoupling in solid-state NMR: factors affecting MAS spin-echo dephasing times, Magn. Reson. Chem. 2007; 45: S198-S208.

Kakugo, et al., "13C NMR Determination of Monomer Sequence Distribution in Ethylene-Propylene Copolymers Prepared with δ-TiC13-Al(C2H2)2Cl", Macromolecules 1982,15, 1150-1152.

Klimke, et al., "Optimisation and Application of Polyolefin Branch Quantification by Melt-State 13C NMR Spectroscopy", Macromol. Chem. Phys. 2006, 207, 382-395.

Parkinson, et al., "Effect of Branch Length on 13C NMR Relaxation Properties in Molten Poly[ethyleneco-(α-olefin)] Model Systems", Macromol. Chem. Phys. 2007, 208, 2128-2133.

Pollard, et al., "Observation of Chain Branching in Polyethylene in the Solid State and Melt via 13C NMR Spectroscopy and Melt NMR Relaxation Time Measurements", Macromolecules 2004, 37, 813-825.

Resconi, et al., "Selectivity in Propene Polymerization with Metallocene Catalysts", Chem. Rev. 2000, 100, 1253-1345.

Wang, et al., "Structural Analysis of Ethylene/Propylene Copolymers Synthesized with a Constrained Geometry Catalyst", Macromolecules 2000, 33, 1157-1162.

Zhou et al., "A new decoupling method for accurate quantification of polyethylene copolymer composition and triad sequence distribution with 13C NMR", Journal of Magnetic Resonance 187 (2007) 225-233.

Singh, et al., "Triad sequence determination of ethylene-propylene copolymers—application of quantitative 13C NMR", Polymer Testing 28 (2009) 475-479.

Russian Office Action for Application No. 2020109549/04(016742) dated Aug. 18, 2020.

Chinese Office Action for Application No. 201880055150.9 dated Aug. 19, 2020.

\* cited by examiner

POLYPROPYLENE COMPOSITION

The present invention is related to a new polypropylene composition which provides an excellent balance between mechanical properties, optical behaviour and low amounts of extractable substances combined with good retortability.

The present invention is furthermore related to the use of the polypropylene composition and articles made therefrom.

Polymers, like polypropylene, are increasingly used in different demanding applications. There is an increasing trend to use polypropylene in a lot of applications throughout the packaging industry.

For all such applications it is a continuous request by the industry to have products at hand that show better mechanical performance (like stiffness and/or impact strength), better optical behaviour and lower amounts of extractable substances at the same time.

The demands can be challenging, since many polymer properties are directly or indirectly interrelated, i.e. improving a specific property can only be accomplished at the expense of another property.

For example, polypropylene films are quite often used in the packaging industry for consumer related articles with good "see-through" properties on the content of the packed goods. There is an also increasing trend in the medical packaging industry to use such polypropylene films. In these technical areas good optical properties, especially low haze is always required.

In the field of some food applications such as retort pouches or some medical applications, a sterilization treatment is needed.

The most common sterilization procedures are the use of heat (steam), radiation (beta radiation, electrons, or gamma radiation) or chemicals (usually ethylene oxide). Steam sterilization is usually carried out in a temperature range of about 120° C. to 130° C. Thus, the material should have a sufficient thermal stability, like a melting temperature significantly higher than the usual steam sterilization temperature of about 120° C. to 130° C.

Of course, treatment of a polymer under the sterilization conditions outlined above can impair its final properties, especially the optical properties such as transparency, i.e. low haze.

In addition certain regulations have to be fulfilled regarding the use of such materials in food contact applications, thus compliancy to food regulations in terms of soluble resp. extractable components such as hexane solubles is a must in advanced packaging applications.

A higher content of soluble resp. extractable components such as hexane solubles is also undesirable in the field of medical packaging.

In the food packaging industry it has become quite common to use plastic containers, notably pouches containing sterilized or pre-cooked foods. Retort pouches offer many advantages over rigid metal packages such as faster cooking/sterilizing time, less shelf storage space, easier disposal, improved food taste, etc. Typical pouches have a multilayer structure with polyolefins such as polyethylene or polypropylene, adhesives, barrier and external layers. It is desired that the polyolefin material imparts stiffness as well as high impact strength to the final packaging material.

Also in the medical packaging industry the polymer used should impart sufficient stiffness as well as high impact strength to the final packaging material. In the case of medical applications, softness rather than stiffness is a key-requirement.

It is known that heterophasic propylene copolymers (HECOs) are a generally suitable class of base polymers applicable for above described applications.

Nevertheless there is still the desire to improve the overall performance of such materials. Heterophasic propylene polymers (HECOs) are polymers having a matrix phase and a disperse phase. The matrix phase is quite often a propylene homopolymer and the disperse phase is usually an ethylene/α-olefin rubber copolymer.

Stiffness of such heterophasic propylene copolymers (HECOs) can for instance be improved by increasing the crystallinity and/or the relative amount of homopolymer within the composition. As a consequence, the material becomes more brittle, thereby resulting in poor impact properties and/or worse optical properties.

Heterophasic propylene copolymers have in general good impact strength over a wide temperature range but this normally goes together with rather low transparency. Impact strength is mainly influenced by the amount of rubber, its molecular weight and its composition. It is generally known that on top of the amount of rubber, its molecular weight, respectively intrinsic viscosity, as well as the comonomer content affects the mechanical and optical performance. As explained e.g. in the paper of Gahleitner et al., J. Appl. Polym. Sci. 130 (2013) 3028-3037, the increase of the rubber amount is the only straightforward parameter in this context. The relative comonomer content in the rubber phase affects the phase structure as well as the impact strength in complex ways, and the molecular weight of the rubber phase has a highly nonlinear effect on impact strength in addition depending on the geometry. All three parameters also define the amount of extractable substances.

WO2004055101 relates to a flat film for thermoforming with high toughness, high stiffness and high transparency, comprising a polyolefin composition and an alpha-nucleating agent. The optical properties, especially haze, are high as are the given values for hexane extractables via FDA method ($C6_{FDA}$).

EP1661935 relates to a cast film or blown film comprising a composition comprising 80 to 95 wt % of a polypropylene matrix (A) with an MFR of 1 to 30 g/10 min being a homopolymer or a copolymer, which has a comonomer content of less than 3 wt %, 5 to 20 wt % of an ethylene-propylene-rubber (EPR) (B) with at least 55 wt % propylene and having an intrinsic viscosity (IV) of 1 to 2.5 dl/g and 0.0001 to 1 wt % of an nucleating agent. These materials are quite soft and show relative high amounts for hexane extractables via FDA method ($C6_{FDA}$).

EP2585527 B1 discloses a polyolefin composition comprising (percent by weight):
A) from 1.0% to 9.5%; of a copolymer of propylene and 1-hexene wherein said copolymer comprises from 0.1 to 5% of recurring units derived from 1-hexene; and
B) from 80.5% to 99% of a heterophasic polypropylene composition comprising:
B1) from 50% to 85% of a propylene homopolymer, said propylene polymer being insoluble in xylene at ambient temperature in an amount over 85% having a polydispersity Index ranging from 3 to 10; and a Melt Index from 0.5 to 10 dg/min; and
B2) from 5% to 50% of a copolymer of ethylene and propylene having an ethylene derived units content ranging from 30% to 70%,
said polymeric composition having a Melt Index from 0.05 to 10 dg/min.

The disclosed composition is suitable to produce pipe systems and sheets.

Optical properties as well as values for extractables are not mentioned, but in view of the high ethylene content of (B2) and its rather high molecular weight resp. intrinsic viscosity indicated in both description and examples one can deduct very high haze levels for the inventive compositions.

Although a lot of development work has been done in that field, there is still a need for further improvement and thus to design materials having an improved balance between mechanical properties, optical behaviour and low amounts of extractable substances combined with good retortability, i.e. sufficient thermal stability to enable sterilization treatment without negatively affecting the optical properties.

The present invention is based on the finding that the above discussed needs for heat sealing applications can be achieved by a specific design of a polypropylene composition.

SUMMARY OF THE INVENTION

Thus the present invention is related to a polypropylene composition comprising a blend of
(A) 85.0 to 95.0 wt % of a heterophasic propylene copolymer (HECO) comprises
  (A-1) 80.0 to 90.0 wt % of a matrix (M) being a propylene homopolymer (H-PP) with an $MFR_2$ (230° C., 2.16 kg, ISO1133) of from 0.8-10.0 g/10 min and
  (A-2) 10.0 to 20.0 wt % of an elastomeric propylene-ethylene copolymer (EPC) dispersed in said matrix (M),
said heterophasic propylene copolymer having with a C2 content of the xylene cold soluble (XCS) fraction of from 15.0 to 30.0 wt % and an intrinsic viscosity (iV; determined according to DIN ISO 1628/1 in decalin at 135° C.) of the XCS fraction of from 1.2 to 2.6 dl/g
(B) 5.0 to 15.0 wt % of a propylene-hexene random copolymer with a hexene content in the range of from 2.0 to 10.0 wt % and an $MFR_2$ (230° C., 2.16 kg, ISO1133) in a range of from 1.0 to 20.0 g/10 min and
(C) optionally an alpha nucleating agent.

It has surprisingly been found out that such compositions have an optimized or improved balance between mechanical properties, beneficial optical properties, low amounts of extractable substances and sufficient thermal stability to enable sterilization treatment, by which the optical properties are kept on a high level before and after sterilization.

In an embodiment of the present invention the heterophasic propylene copolymer (HECO) (A) is obtainable, preferably obtained, in the presence of a Ziegler-Natta catalyst and the propylene-hexene random copolymer (B) is obtainable, preferably obtained, in the presence of a metallocene catalyst.

In a further embodiment the invention is related to the use of the above defined composition for preparing articles and to the articles themselves.

DETAILED DESCRIPTION

In the following the individual components are defined in more detail.

The polypropylene composition of the present inventions comprises a blend of
(A) a heterophasic propylene copolymer (HECO) and
(B) a propylene-hexene random copolymer
Component (A) Heterophasic Propylene Copolymer (HECO)

The particular heterophasic polypropylene composition of the present invention comprises at least (A-1) the matrix (M) being a polypropylene homopolymer (H-PP)
(A-2) the elastomeric propylene-ethylene copolymer (EPC) dispersed in said matrix (M), as defined in more detail below.

Optionally it further comprises component (A-3) being a crystalline ethylene copolymer (CEC), and/or
(A-4) a nucleating agent.

The term "heterophasic polypropylene composition" used herein denotes compositions consisting of a polypropylene homopolymer matrix resin and an elastomeric propylene-ethylene copolymer dispersed in said matrix resin and optionally a crystalline ethylene copolymer (CEC) and optionally a nucleating agent.

In the present invention, the term "matrix" is to be interpreted in its commonly accepted meaning, i.e. it refers to a continuous phase (in the present invention a continuous polymer phase) in which isolated or discrete particles such as rubber particles may be dispersed. The propylene homopolymer is present in such an amount that it forms a continuous phase which can act as a matrix.

Ad Component (A-1):

Component (A-1) of the particular heterophasic polypropylene copolymer is a propylene homopolymer forming the matrix of the heterophasic polypropylene copolymer.

The expression homopolymer used in the instant invention relates to a polypropylene that consists substantially, i.e. of at least 97.0 wt %, preferably of at least 98.0 wt %, more preferably of at least 99.0 wt %, still more preferably of at least 99.8 wt % of propylene units. In a preferred embodiment only propylene units in the propylene homopolymer are detectable.

The propylene homopolymer matrix has a melt flow rate $MFR_2$ (ISO 1133; 230° C.; 2.16 kg) in the range of 0.8 to 10.0 g/10 min, preferably in the range of 1.0 to 8.0 g/10 min, more preferably in the range of 1.5 to 5.0 g/10 min, even more preferably in the range of 2.0 to 4.5 g/10 min. The $MFR_2$ of the matrix is named matrix melt flow rate ($MFR_M$).

The propylene homopolymer has a melting temperature $T_{m1}$ determined by DSC analysis according to ISO 11357.

Preferably, $T_{m1}$ of the propylene homopolymer is within the range of 160° C. to 170° C., more preferably within the range of 161° C. to 169° C. and most preferably within the range of 162° C. to 168° C.

The polypropylene homopolymer may comprise or consist of a single polypropylene homopolymer fraction (=unimodal), but may also comprise a mixture of different polypropylene homopolymer fractions.

In cases where the polypropylene homopolymer comprises different fractions, the polypropylene homopolymer is understood to be bi- or multimodal.

These fractions may have different average molecular weight or different molecular weight distribution.

It is preferred that the polypropylene homopolymer can be bimodal or multimodal in view of molecular weight or molecular weight distribution.

It is alternatively preferred that the polypropylene homopolymer can be unimodal in view of average molecular weight and/or molecular weight distribution.

Thus in one embodiment or the present invention the matrix (M) is unimodal, whereas in another embodiment the matrix (M) is bimodal and consists of two propylene homopolymer fractions (H-PP-1) and (H-PP-2).

Ad Component (A-2):

Component (A-2) is an elastomeric propylene-ethylene copolymer (EPC), which is a copolymer of propylene and ethylene being dispersed in said matrix (M) (i.e. dispersed phase).

Component (A-2) of the particular heterophasic polypropylene copolymer is the so called ethylene-propylene rubber phase The term "ethylene-propylene rubber phase" denotes the material which is essentially dispersed in the matrix and is soluble in p-xylene under the conditions described as XCS.

The terms "elastomeric propylene-ethylene copolymer (EPC)", "xylene cold soluble (XCS) fraction of the heterophasic propylene copolymer", "dispersed phase" and "ethylene-propylene rubber" are to be interpreted in its commonly accepted meaning, i.e. they denote the same, i.e. are interchangeable.

Thus the amount of elastomeric propylene-ethylene copolymer (EPC) constitutes the amount of the xylene cold soluble (XCS) fraction of the heterophasic propylene copolymer, which is in the range of 10.0 to 20.0 wt % in view of the heterophasic propylene copolymer, preferably in the range of 10.5 to 18.0 wt % and more preferably in the range of 11.0 to 17.0 wt %.

The intrinsic viscosity (iV) measured according to ISO 1628-1 (at 135° C. in decalin) of the XCS fraction is in the range of more than 1.2 to 2.6 dl/g, preferably in the range of 1.4 to 2.4 dl/g and more preferably in the range of 1.6 to 2.2 dl/g.

The ethylene comonomer content of the XCS fraction is in the range of of 15.0 to 30.0 wt %, preferably in the range of 20.0 to 30.0 wt % and more preferably in the range of 25.0 to 28.0 wt %.

The elastomeric propylene-ethylene copolymer (EPC) can either be synthesised in the later step(s) of a multistage process, after the polypropylene homopolymer (A-1) has been synthesized.

Alternatively, elastomeric propylene-ethylene copolymer (EPC) can be polymerized separately and mixed with the polypropylene homopolymer (A-1) in a separate melt blending step.

It is preferred, that the incorporation of the polypropylene homopolymer (A-2) into the polypropylene homopolymer (A-1) is done during a multistage polymerization process.

Like the propylene homopolymer matrix, the dispersed phase can be unimodal or multimodal, like bimodal.

In one embodiment, the dispersed phase is unimodal. More particularly, the dispersed phase is preferably unimodal in view of the intrinsic viscosity and/or the comonomer distribution. Concerning the definition of unimodal and multimodal, like bimodal, it is referred to the definition above.

Preferably the unimodal dispersed phase is made in one reaction stage, more preferably in a gas phase reactor ad comprises, respectively consists of one propylene-ethylene copolymer fraction (EPC).

Ad Component (A-3)

As component (A-3) a crystalline ethylene copolymer with an α-olefin with 3-10 carbon atoms is optionally present.

α-olefins with 3-10 carbon atoms are for example propylene, 1-butene, 1-pentene, 1-hexene, 1-heptene and 1-octene.

The crystalline ethylene copolymer is a by-reaction product obtained by the preparation of the heterophasic polypropylene composition. Such crystalline ethylene copolymer is present as inclusion in the amorphous phase due to thermodynamic reasons.

The crystalline ethylene copolymer has a melting temperature $T_{m2}$ and a melting enthalpy $H_{m2}$ as determined by DSC analysis according to ISO 11357.

Preferably, $T_{m2}$ of the crystalline ethylene copolymer is within the range of 105° C. to 130° C., more preferably within the range of 110° C. to 127° C. and most preferably within the range of 112° C. to 124° C.

Preferably, $H_{m2}$ of the crystalline ethylene copolymer is less than 2.0 J/g, more preferably less than 1.0 J/g and most preferably less than 0.5 J/g.

Ad Component (A-4)

As optional component (A-4) a nucleating agent (NA) for promoting the α-phase of isotactic polypropylene can be present.

Preferably the nucleating agent is a polymeric nucleating agent, more preferably a vinylcycloalkane polymer and/or a vinylalkane polymer.

Said polymeric nucleating agent may be introduced into the composition by blending with a masterbatch (MB) together with e.g. a carrier polymer or during polymerization of the heterophasic propylene copolymer (HECO), preferably, the polymeric nucleating agent is introduced into the composition by prepolymerizing the catalyst used to prepare a part or all of the heterophasic propylene copolymer (HECO).

Any known polymeric nucleating agent may be employed including polymers of vinyl alkanes and vinyl cycloalkanes.

A preferred example of such a polymeric nucleating agent is a vinyl polymer, such as a vinyl polymer derived from monomers of the formula

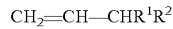

$$CH_2=CH-CHR^1R^2$$

wherein $R^1$ and $R^2$, together with the carbon atom they are attached to, form an optionally substituted saturated or unsaturated or aromatic ring or a fused ring system, wherein the ring or fused ring moiety contains four to 20 carbon atoms, preferably 5 to 12 membered saturated or unsaturated or aromatic ring or a fused ring system or independently represent a linear or branched $C_4$-$C_{30}$ alkane, $C_4$-$C_{20}$ cycloalkane or $C_4$-$C_{20}$ aromatic ring. Preferably $R^1$ and $R^2$, together with the C-atom wherein they are attached to, form a five- or six-membered saturated or unsaturated or aromatic ring or independently represent a lower alkyl group comprising from 1 to 4 carbon atoms. Preferred vinyl compounds for the preparation of a polymeric nucleating agent to be used in accordance with the present invention are in particular vinyl cycloalkanes, in particular vinyl cyclohexane (VCH), vinyl cyclopentane, and vinyl-2-methyl cyclohexane, 3-methyl-1-butene, 3-ethyl-1-hexene, 3-methyl-1-pentene, 4-methyl-1-pentene or mixtures thereof. VCH is a particularly preferred monomer.

In case the nucleating agent is incorporated to the polypropylene composition in the form of a masterbatch (MB) said polymeric nucleating agent, which is preferably alpha-nucleating agent, most preferably a vinylcycloalkane, like vinylcyclohexane (VCH), polymer and/or vinylalkane polymer, preferably vinylcyclohexane (VCH), as defined above or below, is preferably present in an amount of not more than 500 ppm, more preferably of 1 to 200 ppm, and still more preferably of 5 to 100 ppm, based on the weight of the master batch (100 wt %). In this embodiment, more preferably, said masterbatch (MB) is present in an amount of not more than 10.0 wt %, more preferably not more than 5.0 wt % and most preferably not more than 3.5 wt %, with the preferred amount of masterbatch (MB) being from 1.5 to 3.5 wt %, based on the total amount of the heterophasic propylene copolymer (HECO). Most preferably the masterbatch (MB) comprises, preferably consists of a homopolymer or copolymer, preferably homopolymer, of propylene which has been nucleated according to BNT-technology as described below.

It is preferred that the nucleating agent is introduced to the polypropylene composition during the polymerization process of the heterophasic propylene copolymer (HECO). The nucleating agent is preferably introduced to the heterophasic propylene copolymer (HECO) by first polymerizing the above defined vinyl compound, preferably vinylcycloalkane, as defined above or below, in the presence of a catalyst system comprising a solid catalyst component, preferably a solid Ziegler Natta catalyst component, a cocatalyst and optional external donor, and the obtained reaction mixture of the polymer of the vinyl compound, preferably vinyl cyclohexane (VCH) polymer, and the catalyst system is then used for producing the heterophasic propylene copolymer (HECO). The above incorporation of the polymeric nucleating agent to the heterophasic propylene copolymer (HECO) during the polymerization of said heterophasic propylene copolymer (HECO) is called herein as BNT-technology as described below.

Said obtained reaction mixture is herein below referred interchangeably as modified catalyst system.

Preferably the polymeric nucleating agent is vinylcyclohexane (VCH) polymer which is introduced into the heterophasic propylene copolymer (HECO) by the BNT technology.

More preferably in this preferred embodiment, the amount of polymeric nucleating agent, like vinylcyclohexane (VCH), polymer and/or vinylalkane polymer, more preferably of vinylcyclohexane (VCH) polymer, in the heterophasic propylene copolymer (HECO) is not more than 500 ppm, more preferably of 1 to 200 ppm, most preferably 5 to 100 ppm.

With regard to the BNT-technology reference is made to the international applications WO 99/24478, WO 99/24479 and particularly WO 00/68315. According to this technology a catalyst system, preferably a Ziegler-Natta procatalyst, can be modified by polymerizing a vinyl compound in the presence of the catalyst system, comprising in particular the Ziegler-Natta procatalyst, an external donor and a cocatalyst, which vinyl compound has the formula: $CH_2=CH—CHR^1R^2$ as defined above.

The polymerized vinyl compound acts as an alpha-nucleating agent. The weight ratio of vinyl compound to solid catalyst component in the modification step of the catalyst is preferably of up to 5 (5:1), preferably up to 3 (3:1) most preferably from 0.5 (1:2) to 2 (2:1). The most preferred vinyl compound is vinylcyclohexane (VCH).

When a nucleating agent is introduced to the heterophasic propylene copolymer (HECO) during the polymerization process, the amount of nucleating agent present in the heterophasic propylene copolymer (HECO) is preferably not more than 500 ppm, more preferably is 0.025 to 200 ppm, still more preferably is 1 to 100 ppm, and most preferably is 5 to 100 ppm, based on the heterophasic propylene copolymer (HECO) and the nucleating agent, preferably based on the total weight of the heterophasic propylene copolymer (HECO) including all additives.

The use of the polymeric nucleating agent in accordance with the present invention enables the preparation of heterophasic propylene copolymer (HECO) having highly satisfactory mechanical properties, i.e. for improved stiffness/impact balance, so that it is not required for the compositions in accordance with the present invention to contain low molecular weight nucleating agents, in particular costly particulate nucleating agents like organo-phosphates or soluble nucleants like sorbitol- or nonitol-derived nucleating agents.

Ad Heterophasic Propylene Copolymer

The heterophasic polypropylene copolymer (HECO) of the present inventions is characterized by a total melt flow rate ($MFR_T$) (ISO 1133; 230° C.; 2.16 kg) in the range of 1.0 to 8.0 g/10 min, preferably in the range of 1.5 to 6.5 g/10 min and more preferably in the range of 2.0 to 5.5 g/10 min.

It is also appreciated that the total content of the ethylene comonomers in the heterophasic propylene copolymer (HECO) is rather moderate.

Accordingly it is preferred that the heterophasic propylene copolymer (HECO) has a total ethylene comonomer content in the range of 1.8 to 6.5 wt %, preferably in the range of 2.0. to 6.0 wt %, more preferably in the range of 2.5 to 5.0 wt % and even more preferably in the range of 3.0 to 4.6 wt %.

The heterophasic propylene copolymer (HECO) of the present invention is composed of components (A-1) and (A-2) and optional components (A-3) and/or (A-4).

Component (A-1) is present in an amount of from 80.0 to 90.0 wt %, preferably from 82.0 to 90.0 wt % and more preferably from 83.0 to 90.0 wt %

Component (A-2) is present in an amount of from 10.0 to 20.0 wt %, preferably from 10.0 to 18.0 wt % and more preferably from 10.0 to 17.0 wt %.

Component (A-3) is present in an amount of from 0.0 to 4.0 wt %, preferably from 0.0 to 2.0 wt % and more preferably from 0.0 to 1.5 wt %.

Component (A-4) is present in an amount of from 0.0 to 0.1 wt %, preferably from 0.0 to 0.05 wt % and more preferably from 0.0 to 0.01 wt %.

If component (A-4) is added in the form of a masterbatch (MB), the amount of masterbatch containing component (A-4) is up to 10.0 wt % related to the entire heterophasic propylene copolymer (HECO), preferably up to 5.0 wt % and more preferably in the range of 1.5 to 3.5 wt % based on the entire heterophasic propylene copolymer (HECO).

The sum of fractions (A-1), (A-2), (A-3) and (A-4) is 100 wt % or lower depending on the presence of further fractions or additives or components. The ranges in percent by weight (wt %) as used herein define the amount of each of the fractions or components based on the entire heterophasic propylene copolymer (HECO) according to the present invention. All fractions, components and additives together give a sum of 100 wt %.

The heterophasic propylene copolymer (HECO) according to the present invention apart from the polymeric components and the nucleating agent (A-4), optionally in the form of a masterbatch (MB), may comprise further non-polymeric components, e.g. additives for different purposes.

The following are optional additives: process and heat stabilisers, pigments and other colouring agents allowing retaining transparency, antioxidants, antistatic agents, slip agents, antiblocking agent, UV stabilisers and acid scavengers.

Depending on the type of additive, these may be added in an amount of 0.001 to 2.0 wt %, based on the weight of the heterophasic propylene copolymer (HECO).

The heterophasic propylene copolymer (HECO) of the present invention comprises a matrix being a propylene homopolymer (A-1) and dispersed therein an ethylene propylene rubber (A-2). Thus the matrix contains (finely)

dispersed inclusions being not part of the matrix and said inclusions contain the ethylene propylene rubber (A-2). The term inclusion indicates that the matrix and the inclusion form different phases within the heterophasic propylene copolymer (HECO). The presence of second phases or the so called inclusions are for instance visible by high resolution microscopy, like electron microscopy or atomic force microscopy, or by dynamic mechanical thermal analysis (DMTA). Specifically, in DMTA the presence of a multiphase structure can be identified by the presence of at least two distinct glass transition temperatures.

The heterophasic polypropylene composition of the present invention thus exhibits at least two glass transitions (Tg) in DMTA at significantly different temperatures. One Tg related to the propylene homopolymer (a) component is located in the range of −5.0 to 5.0° C., another Tg related to the ethylene propylene rubber (b) is located in the range of −55 to −35° C.

Preparation of the Heterophasic Propylene Copolymer (HECO)

The heterophasic propylene copolymer (HECO) in accordance with the present invention may be prepared by any suitable process, including in particular blending processes such as mechanical blending including mixing and melt blending processes and any combinations thereof as well as in-situ blending during the polymerization process. These can be carried out by methods known to the skilled person, including batch processes and continuous processes. The heterophasic propylene copolymer (HECO) according to the invention is preferably prepared by a sequential polymerization process, as described below, in the presence of a catalyst system comprising a Ziegler-Natta Catalyst (ZN-C), a cocatalyst (Co) and optionally an external donor (ED), as described below.

The term "sequential polymerization system" according to this invention indicates that the heterophasic propylene copolymer (HECO) is produced in at least two polymerization reactors connected in series. Accordingly, the present polymerization system comprises at least a first polymerization reactor (R1), a second polymerization reactor (R2), optionally a third polymerization reactor (R3), and further optionally a fourth polymerization reactor (R4). The term "polymerization reactor" shall indicate that the main polymerization takes place.

Preferably, at least one of the two polymerization reactors (R1) and (R2) is a gas phase reactor (GPR). More preferably the second polymerization reactor (R2), the optional third polymerization reactor (R3) and the optional fourth polymerization reactor (R4) are gas phase reactors (GPRs), i.e. a first gas phase reactor (GPR1) and a second gas phase reactor (GPR2) and a third gas phase reactor (GPR3). A gas phase reactor (GPR) according to this invention is preferably a fluidized bed reactor, a fast fluidized bed reactor or a settled bed reactor or any combination thereof.

Accordingly, the first polymerization reactor (R1) is preferably a slurry reactor (SR) and can be any continuous or simple stirred batch tank reactor or loop reactor operating in bulk or slurry. Bulk means a polymerization in a reaction medium that comprises of at least 60% (w/w) monomer. According to the present invention the slurry reactor (SR) is preferably a (bulk) loop reactor (LR).

In this first polymerization reactor (R1) the matrix polypropylene (H-PP) or part of it, i.e. a first propylene homopolymer fraction (H-PP-1), is produced.

Preferably this propylene homopolymer of the first polymerization reactor (R1), more preferably the polymer slurry of the loop reactor (LR) containing the matrix (M) or part of it, i.e. a first propylene homopolymer fraction (H-PP-1), is directly fed into the second polymerization reactor (R2), i.e. into the (first) gas phase reactor (GPR1), without a flash step between the stages.

This kind of direct feed is described in EP 887379 A, EP 887380 A, EP 887381 A and EP 991684 A.

By "direct feed" is meant a process wherein the content of the first polymerization reactor (R1), i.e. of the loop reactor (LR), the polymer slurry comprising the propylene homopolymer matrix (H-PP) or part of it, i.e. a first propylene homopolymer fraction (H-PP-1), is led directly to the next stage gas phase reactor.

Alternatively, the propylene homopolymer of the first polymerization reactor (R1), preferably polymer slurry of the loop reactor (LR) containing the propylene homopolymer matrix, may be also directed into a flash step or through a further concentration step before fed into the second polymerization reactor (R2), i.e. into the $1^{st}$ gas phase reactor (GPR1). Accordingly, this "indirect feed" refers to a process wherein the content of the first polymerization reactor (R1), of the loop reactor (LR), i.e. the polymer slurry, is fed into the second polymerization reactor (R2), into the (first) gas phase reactor (GPR1), via a reaction medium separation unit and the reaction medium as a gas from the separation unit.

More specifically, the second polymerization reactor (R2) and any subsequent reactor, for instance, the third (R3) or fourth polymerization reactor (R4) are preferably gas phase reactors (GPRs). Such gas phase reactors (GPR) can be any mechanically mixed or fluid bed reactors. Preferably the gas phase reactors (GPRs) comprise a mechanically agitated fluid bed reactor with gas velocities of at least 0.2 m/sec. Thus it is appreciated that the gas phase reactor is a fluidized bed type reactor preferably with a mechanical stirrer.

Thus, in a preferred embodiment the first polymerization reactor (R1) is a slurry reactor (SR), like loop reactor (LR), whereas the second polymerization reactor (R2) and the optional third polymerization reactor (R3), and the optional fourth polymerization reactor (R4) are gas phase reactors (GPRs).

Accordingly for the instant process at least two, preferably two polymerization reactors (R1), and (R2) or three polymerization reactors (R1), (R2) and (R3), or even four polymerization reactors (R1), (R2), R(3) and (R4), namely a slurry reactor (SR), like loop reactor (LR) and a (first) gas phase reactor (GPR1), an optional second gas phase reactor (GPR2), and optionally a third gas phase reactor (GPR3) connected in series are used.

Prior to the slurry reactor (SR) a pre-polymerization reactor is placed.

As the process covers also a pre-polymerization step, all of the Ziegler-Natta catalyst (ZN-C) is fed in the pre-polymerization reactor. Subsequently the pre-polymerization product containing the Ziegler-Natta catalyst (ZN-C) is transferred into the first polymerization reactor (R1).

Especially good results are achieved in case the temperature in the reactors is carefully chosen.

Accordingly it is preferred that the operating temperature in the first polymerization reactor (R1) is in the range of 62 to 85° C., more preferably in the range of 65 to 82° C., still more preferably in the range of 67 to 80° C.

Alternatively or additionally to the previous paragraph it is preferred that the operating temperature in the second polymerization reactor (R2) and in the optional third reactor (R3) and the optional the fourth reactor (R4) is in the range of 75 to 95° C., more preferably in the range of 78 to 92° C.

Preferably the operating temperature in the second polymerization reactor (R2) is equal to or higher than the operating temperature in the first polymerization reactor (R1). Accordingly it is preferred that the operating temperature
(a) in the first polymerization reactor (R1) is in the range of 62 to 85° C., more preferably in the range of 65 to 82° C., still more preferably in the range of 67 to 80° C., like 70 to 80° C.;
and
(b) in the second polymerization reactor (R2) is in the range of 75 to 95° C., more preferably in the range of 78 to 92° C., still more preferably in the range of 78 to 88° C.,
with the proviso that the operating temperature in the in the second polymerization reactor (R2) is equal or higher to the operating temperature in the first polymerization reactor (R1).

Typically the pressure in the first polymerization reactor (R1), preferably in the loop reactor (LR), is in the range from 20 to 80 bar, preferably 30 to 70 bar, like 35 to 65 bar, whereas the pressure in the second polymerization reactor (R2), i.e. in the (first) gas phase reactor (GPR1), and in any subsequent reactor, like in the third polymerization reactor (R3), e.g. in the second gas phase reactor (GPR2), or in a fourth polymerization reactor (R4), e.g. in the third gas phase reactor (GPR3) is in the range from 5 to 50 bar, preferably 15 to 40 bar.

Preferably hydrogen is added in each polymerization reactor in order to control the molecular weight, i.e. the melt flow rate $MFR_2$.

Preferably the average residence time is rather long in the polymerization reactors (R1) and (R2). In general, the average residence time (τ) is defined as the ratio of the reaction volume (VR) to the volumetric outflow rate from the reactor (Qo) (i.e. VR/Qo), i.e T=VR/Qo [tau=VR/Qo]. In case of a loop reactor the reaction volume (VR) equals to the reactor volume.

Accordingly the average residence time (τ) in the first polymerization reactor (R1) is preferably at least 5 min, more preferably in the range of 15 to 80 min, still more preferably in the range of 20 to 60 min, like in the range of 24 to 50 min, and/or the average residence time (τ) in the second polymerization reactor (R2) is preferably at least 70 min, more preferably in the range of 70 to 220 min, still more preferably in the range of 80 to 210 min, yet more preferably in the range of 90 to 200 min, like in the range of 90 to 190 min. Preferably the average residence time (τ) in the third polymerization reactor (R3) or in the fourth polymerization reactor (R4)—if present—is preferably at least 30 min, more preferably in the range of 30 to 120 min, still more preferably in the range of 40 to 100 min, like in the range of 50 to 90 min.

As mentioned above the preparation of the heterophasic propylene copolymer (HECO) comprises in addition to the (main) polymerization of the propylene polymer in the at least two polymerization reactors (R1, R2 and optional R3, R4) prior thereto a pre-polymerization in a pre-polymerization reactor (PR) upstream to the first polymerization reactor (R1).

In the pre-polymerization reactor (PR) a polypropylene (Pre-PP) is produced. The pre-polymerization is conducted in the presence of the Ziegler-Natta catalyst (ZN-C). According to this embodiment the Ziegler-Natta catalyst (ZN-C), the co-catalyst (Co), and the external donor (ED) are all introduced to the pre-polymerization step. However, this shall not exclude the option that at a later stage for instance further co-catalyst (Co) and/or external donor (ED) is added in the polymerization process, for instance in the first reactor (R1). In one embodiment the Ziegler-Natta catalyst (ZN-C), the co-catalyst (Co), and the external donor (ED) are only added in the pre-polymerization reactor (PR).

The pre-polymerization reaction is typically conducted at a temperature of 10 to 60° C., preferably from 15 to 50° C., and more preferably from 20 to 45° C.

The pressure in the pre-polymerization reactor is not critical but must be sufficiently high to maintain the reaction mixture in liquid phase. Thus, the pressure may be from 20 to 100 bar, for example 30 to 70 bar.

In a preferred embodiment, the pre-polymerization is conducted as bulk slurry polymerization in liquid propylene, i.e. the liquid phase mainly comprises propylene, with optionally inert components dissolved therein. Furthermore, according to the present invention, an ethylene feed can be employed during pre-polymerization as mentioned above.

It is possible to add other components also to the pre-polymerization stage. Thus, hydrogen may be added into the pre-polymerization stage to control the molecular weight of the polypropylene (Pre-PP) as is known in the art. Further, antistatic additive may be used to prevent the particles from adhering to each other or to the walls of the reactor.

The precise control of the pre-polymerization conditions and reaction parameters is within the skill of the art.

Due to the above defined process conditions in the pre-polymerization, a mixture (MI) of the Ziegler-Natta catalyst (ZN-C) and the polypropylene (Pre-PP) produced in the pre-polymerization reactor (PR) is obtained. Preferably the Ziegler-Natta catalyst (ZN-C) is (finely) dispersed in the polypropylene (Pre-PP). In other words, the Ziegler-Natta catalyst (ZN-C) particles introduced in the pre-polymerization reactor (PR) split into smaller fragments which are evenly distributed within the growing polypropylene (Pre-PP). The sizes of the introduced Ziegler-Natta catalyst (ZN-C) particles as well as of the obtained fragments are not of essential relevance for the instant invention and within the skilled knowledge.

Accordingly, the heterophasic propylene copolymer (HECO) is preferably produced in a process comprising polymerizing propylene in at least two subsequent polymerization steps in the presence of a Ziegler-Natta catalyst, whereby:
a) In the first polymerization reactor (R1), i.e. in a loop reactor (LR), propylene is polymerized obtaining either a first propylene homopolymer fraction (H-PP-1) or the propylene homopolymer matrix (M), transferring said first propylene homopolymer fraction (H-PP-1) or propylene homopolymer matrix (M) to a second polymerization reactor (R2),
c) in the second polymerization reactor (R2) either a second propylene homopolymer fraction (H-PP-2), forming together with the first propylene homopolymer fraction (H-PP-1) the propylene homopolymer matrix (M) or
the propylene copolymer fraction (EPC) in the presence of the propylene homopolymer matrix (M) produced in earlier step a) is produced, whereupon
c) if in the first and the second polymerization reactor the propylene homopolymer matrix (M) is produced, in a third polymerization reactor (R3) the propylene copolymer fraction (EPC) in the presence of the propylene homopolymer matrix (M) produced in earlier steps a) and b) is produced.

In another preferred process also a prepolymerization step is included prior to the reaction in the first polymerization reactor (R1).

In such a pre-polymerization step prior to the reaction in the first polymerization reactor (R1), a mixture (MI) of the Ziegler-Natta catalyst (ZN-C) and the polypropylene (Pre- PP) produced in the pre-polymerization reactor (PR) is obtained. Preferably the Ziegler-Natta catalyst (ZN-C) is (finely) dispersed in the polypropylene (Pre-PP). Subsequent to the pre-polymerization, the mixture (MI) of the Ziegler-Natta catalyst (ZN-C) and the polypropylene (Pre-PP) produced in the pre-polymerization reactor (PR) is transferred to the first reactor (R1). Typically the total amount of the polypropylene (Pre-PP) in the final heterophasic propylene copolymer (HECO) is rather low and typically not more than 5.0 wt %, more preferably not more than 4.0 wt %, still more preferably in the range of 0.5 to 4.0 wt %, like in the range 1.0 of to 3.0 wt %

A preferred multistage process is a "loop-gas phase"-process, as developed by Borealis (known as BORSTAR® technology) and is described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

The catalyst components are preferably all introduced to the prepolymerization step. However, where the solid catalyst component (i) and the cocatalyst (ii) can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

According to the invention the heterophasic polypropylene composition is obtained by a multistage polymerization process, as described above, in the presence of a catalyst system.

In the process described above a Ziegler-Natta catalyst (ZN-C) for the preparation of the heterophasic polypropylene composition is applied. This Ziegler-Natta catalyst (ZN-C) can be any stereo-specific Ziegler-Natta catalyst (ZN-C) for propylene polymerization, which preferably is capable of catalysing the polymerization and copolymerization of propylene and comonomers at a pressure of 500 to 10000 kPa, in particular 2500 to 8000 kPa, and at a temperature of 40 to 110° C., in particular of 60 to 110° C.

Preferably, the Ziegler-Natta catalyst (ZN-C) comprises a high-yield Ziegler-Natta type catalyst including an internal donor component, which can be used at high polymerization temperatures of 80° C. or more.

Such high-yield Ziegler-Natta catalyst (ZN-C) can comprise a succinate, a diether, a phthalate etc., or mixtures therefrom as internal donor (ID), and are known in the art.

Further, the solid catalyst can be supported on suitable external supports e.g. on silica or $MgCl_2$, or can be free of any external support material, like silica or $MgCl_2$, but the catalyst may also be self-supported.

Thus, examples of useful solid catalysts are i.a. those disclosed e.g. in WO-A-2003/000757, WO-A-2003/000754, WO-A-2004/029112, WO2007/137853 and WO2015/197354. These catalysts are solid catalysts of spherical particles with compact structure and low surface area of the particles. Further, these catalysts are featured by a uniform distribution of catalytically active sites through the catalyst particles. Catalysts are prepared by emulsion-solidification method, where no external support is needed. The dispersed phase in the form of liquid droplets of the emulsion forms the catalyst part, which is transformed to solid catalyst particles during the solidification step.

The Ziegler-Natta catalyst (ZN-C) can be further defined by the way as obtained.

Accordingly, in one embodiment of the present invention, the Ziegler-Natta catalyst (ZN-C) is preferably obtained by a process comprising the steps of a)

a1) providing a solution of at least a Group 2 metal alkoxy compound (Ax) being the reaction product of a Group 2 metal compound and a monohydric alcohol (A) comprising in addition to the hydroxyl moiety at least one ether moiety optionally in an organic liquid reaction medium; or a2) a solution of at least a Group 2 metal alkoxy compound (Ax') being the reaction product of a Group 2 metal compound and an alcohol mixture of the monohydric alcohol (A) and a monohydric alcohol (B) of formula ROH, optionally in an organic liquid reaction medium; or a3) providing a solution of a mixture of the Group 2 alkoxy compound (Ax) and a Group 2 metal alkoxy compound (Bx) being the reaction product of a Group 2 metal compound and the monohydric alcohol (B), optionally in an organic liquid reaction medium; or a4) providing a solution of Group 2 alkoxide of formula $M(OR1)_n(OR2)_mX_{2-n-m}$ or mixture of Group 2 alkoxides $M(OR1)_{n'}X_{2-n'}$ and $M(OR2)_{m'}X_{2-m'}$, where M is Group 2 metal, X is halogen, R1 and R2 are different alkyl groups of C2 to C16 carbon atoms, and $0 \le n < 2$, $0 \le m < 2$ and $n+m+(2-n-m)=2$, provided that both n and m≠0, $0 < n' \le 2$ and $0 < m' \le 2$; and b) adding said solution from step a) to at least one compound of a transition metal of Group 4 to 6 and c) obtaining the solid catalyst component particles, and adding a non-phthalic internal donor, at any step prior to step c).

The internal donor or precursor thereof is added preferably to the solution of step a).

According to the procedure above the Ziegler-Natta catalyst can be obtained via precipitation method or via emulsion (liquid/liquid two-phase system)-solidification method depending on the physical conditions, especially temperature used in steps b) and c).

In both methods (precipitation or emulsion-solidification) the catalyst chemistry is the same. In precipitation method combination of the solution of step a) with at least one transition metal compound in step b) is carried out and the whole reaction mixture is kept at least at 50° C., more preferably in the temperature range of 55° C. to 110° C., more preferably in the range of 70° C. to 100° C., to secure full precipitation of the catalyst component in form of a solid particles (step c).

In emulsion-solidification method in step b) the solution of step a) is typically added to the at least one transition metal compound at a lower temperature, such as from −10 to below 50° C., preferably from −5 to 30° C. During agitation of the emulsion the temperature is typically kept at −10 to below 40° C., preferably from −5 to 30° C. Droplets of the dispersed phase of the emulsion form the active catalyst composition. Solidification (step c) of the droplets is suitably carried out by heating the emulsion to a temperature of 70 to 150° C., preferably to 80 to 110° C.

The catalyst prepared by emulsion-solidification method is preferably used in the present invention.

In a preferred embodiment in step a) the solution of a2) or a3) are used, i.e. a solution of (Ax') or a solution of a mixture of (Ax) and (Bx).

Preferably the Group 2 metal is magnesium.

The magnesium alkoxy compounds (Ax), (Ax') and (Bx) can be prepared in situ in the first step of the catalyst preparation process, step a), by reacting the magnesium compound with the alcohol(s) as described above, or said magnesium alkoxy compounds can be separately prepared magnesium alkoxy compounds or they can be even commercially available as ready magnesium alkoxy compounds and used as such in the catalyst preparation process of the invention.

Illustrative examples of alcohols (A) are monoethers of dihydric alcohols (glycol monoethers). Preferred alcohols (A) are C2 to C4 glycol monoethers, wherein the ether moieties comprise from 2 to 18 carbon atoms, preferably from 4 to 12 carbon atoms. Preferred examples are 2-(2-ethylhexyloxy)ethanol, 2-butyloxy ethanol, 2-hexyloxy ethanol and 1,3-propylene-glycol-monobutyl ether, 3-butoxy-2-propanol, with 2-(2-ethylhexyloxy)ethanol and 1,3-propylene-glycol-monobutyl ether, 3-butoxy-2-propanol being particularly preferred.

Illustrative monohydric alcohols (B) are of formula ROH, with R being straight-chain or branched C6-C10 alkyl residue. The most preferred monohydric alcohol is 2-ethyl-1-hexanol or octanol.

Preferably a mixture of Mg alkoxy compounds (Ax) and (Bx) or mixture of alcohols (A) and (B), respectively, are used and employed in a mole ratio of Bx:Ax or B:A from 8:1 to 2:1, more preferably 5:1 to 3:1.

Magnesium alkoxy compound may be a reaction product of alcohol(s), as defined above, and a magnesium compound selected from dialkyl magnesiums, alkyl magnesium alkoxides, magnesium dialkoxides, alkoxy magnesium halides and alkyl magnesium halides. Alkyl groups can be a similar or different C1-C20 alkyl, preferably C2-C10 alkyl. Typical alkyl-alkoxy magnesium compounds, when used, are ethyl magnesium butoxide, butyl magnesium pentoxide, octyl magnesium butoxide and octyl magnesium octoxide. Preferably the dialkyl magnesiums are used. Most preferred dialkyl magnesiums are butyl octyl magnesium or butyl ethyl magnesium.

It is also possible that magnesium compound can react in addition to the alcohol (A) and alcohol (B) also with a polyhydric alcohol (C) of formula R"(OH)m to obtain said magnesium alkoxide compounds. Preferred polyhydric alcohols, if used, are alcohols, wherein R" is a straight-chain, cyclic or branched C2 to C10 hydrocarbon residue, and m is an integer of 2 to 6.

The magnesium alkoxy compounds of step a) are thus selected from the group consisting of magnesium dialkoxides, diaryloxy magnesiums, alkyloxy magnesium halides, aryloxy magnesium halides, alkyl magnesium alkoxides, aryl magnesium alkoxides and alkyl magnesium aryloxides. In addition a mixture of magnesium dihalide and a magnesium dialkoxide can be used.

The solvents to be employed for the preparation of the present catalyst may be selected among aromatic and aliphatic straight chain, branched and cyclic hydrocarbons with 5 to 20 carbon atoms, more preferably 5 to 12 carbon atoms, or mixtures thereof. Suitable solvents include benzene, toluene, cumene, xylol, pentane, hexane, heptane, octane and nonane. Hexanes and pentanes are particular preferred.

Mg compound is typically provided as a 10 to 50 wt % solution in a solvent as indicated above. Typical commercially available Mg compound, especially dialkyl magnesium solutions are 20-40 wt % solutions in toluene or heptanes.

The reaction for the preparation of the magnesium alkoxy compound may be carried out at a temperature of 40° to 70° C. Most suitable temperature is selected depending on the Mg compound and alcohol(s) used.

The transition metal compound of Group 4 to 6 is preferably a titanium compound, most preferably a titanium halide, like TiCl4.

The non-phthalic internal donor used in the preparation of the catalyst according to this embodiment of the invention is preferably selected from (di)esters of non-phthalic carboxylic (di)acids, 1,3-diethers, derivatives and mixtures thereof. Especially preferred donors are diesters of mono-unsaturated dicarboxylic acids, in particular esters belonging to a group comprising malonates, maleates, succinates, citraconates, glutarates, cyclohexene-1,2-dicarboxylates and benzoates, and any derivatives and/or mixtures thereof. Preferred examples are e.g. substituted maleates and citraconates, most preferably citraconates.

In emulsion method, the two phase liquid-liquid system may be formed by simple stirring and optionally adding (further) solvent(s) and additives, such as the turbulence minimizing agent (TMA) and/or the emulsifying agents and/or emulsion stabilizers, like surfactants, which are used in a manner known in the art for facilitating the formation of and/or stabilize the emulsion. Preferably, surfactants are acrylic or methacrylic polymers. Particular preferred are unbranched C12 to C20 (meth)acrylates such as poly(hexadecyl)-methacrylate and poly(octadecyl)-methacrylate and mixtures thereof. Turbulence minimizing agent (TMA), if used, is preferably selected from alpha-olefin polymers of alpha-olefin monomers with 6 to 20 carbon atoms, like polyoctene, polynonene, polydecene, polyundecene or polydodecene or mixtures thereof. Most preferable it is polydecene.

The solid particulate product obtained by precipitation or emulsion-solidification method may be washed at least once, preferably at least twice, most preferably at least three times with an aromatic and/or aliphatic hydrocarbons, preferably with toluene, heptane or pentane. The catalyst can further be dried, as by evaporation or flushing with nitrogen, or it can be slurried to an oily liquid without any drying step.

The finally obtained Ziegler-Natta catalyst is desirably in the form of particles having generally an average particle size range of 5 to 200 μm, preferably 10 to 100. Particles are compact with low porosity and have surface area below 20 g/m², more preferably below 10 g/m². Typically the amount of Ti is 1 to 6 wt %, Mg 10 to 20 wt % and donor 10 to 40 wt % of the catalyst composition.

Detailed description of preparation of such catalysts is disclosed for example in WO 2012/007430, EP2610271, EP 261027 and EP2610272.

The Ziegler-Natta catalyst (ZN-C) is preferably used in association with an alkyl aluminum cocatalyst (Co) and optionally external donors (ED).

As further component in the instant polymerization process an external donor (ED) is preferably present. Suitable external donors include certain silanes, ethers, esters, amines, ketones, heterocyclic compounds and blends of these. It is especially preferred to use a silane. It is most preferred to use silanes of the general formula

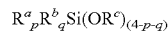

wherein $R^a$, $R^b$ and $R^c$ denote a hydrocarbon radical, in particular an alkyl or cycloalkyl group, and wherein p and q are numbers ranging from 0 to 3 with their sum p+q being equal to or less than 3. $R^a$, $R^b$ and $R^c$ can be chosen independently from one another and can be the same or different. Specific examples of such silanes are (tert-butyl)$_2$Si(OCH$_3$)$_2$, (cyclohexyl)(methyl)Si(OCH$_3$)$_2$, (phenyl)$_2$Si(OCH$_3$)$_2$ and (cyclopentyl)$_2$Si(OCH$_3$)$_2$, or of general formula

wherein $R^3$ and $R^4$ can be the same or different a represent a hydrocarbon group having 1 to 12 carbon atoms.

$R^3$ and $R^4$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^3$ and $R^4$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both $R^3$ and $R^4$ are the same, yet more preferably both $R^3$ and $R^4$ are an ethyl group.

Especially preferred external donors (ED) are the dicyclopentyl dimethoxy silane donor (D-donor) or the cyclohexylmethyl dimethoxy silane donor (C-Donor).

In addition to the Ziegler-Natta catalyst (ZN-C) and the optional external donor (ED), a co-catalyst (Co) can be used. The co-catalyst (Co) is preferably a compound of group 13 of the periodic table (IUPAC), e.g. organo aluminum, such as an aluminum compound, like aluminum alkyl, aluminum halide or aluminum alkyl halide compound. Accordingly, in one specific embodiment the co-catalyst (Co) is a trialkylaluminium, like triethylaluminium (TEAL), dialkyl aluminium chloride or alkyl aluminium dichloride or mixtures thereof. In one specific embodiment the co-catalyst (Co) is triethylaluminium (TEAL).

Preferably the ratio between the co-catalyst (Co) and the external donor (ED) [Co/ED] and/or the ratio between the co-catalyst (Co) and the transition metal (TM) [Co/TM] should be carefully chosen.

Accordingly,
(a) the mol-ratio of co-catalyst (Co) to external donor (ED) [Co/ED] must be in the range of 5 to 45, preferably is in the range of 5 to 35, more preferably is in the range of 5 to 25; and optionally
(b) the mol-ratio of co-catalyst (Co) to titanium compound (TC) [Co/TC] must be in the range of above 80 to 500, preferably is in the range of 100 to 350, still more preferably is in the range of 120 to 300.

The heterophasic polypropylene composition (HECO) according to this invention is preferably produced in the presence of
(a) a Ziegler-Natta catalyst (ZN-C) comprising an internal donor (ID),
(b) optionally a co-catalyst (Co), and
(c) optionally an external donor (ED).

As mentioned above the Ziegler-Natta catalyst (ZN-C) is optionally modified by the so called BNT-technology during the above described pre-polymerization step in order to introduce the polymeric nucleating agent.

Such a polymeric nucleating agent is as described above a vinyl polymer, such as a vinyl polymer derived from monomers of the formula

as described above.

The weight ratio of vinyl compound to polymerization catalyst in the modification step of the polymerization catalyst preferably is 0.3 or more up to 40, such as 0.4 to 20 or more preferably 0.5 to 15, like 0.5 to 2.0.

The polymerization of the vinyl compound, e. g. VCH, can be done in any inert fluid that does not dissolve the polymer formed (e. g. polyVCH). It is important to make sure that the viscosity of the final catalyst/polymerized vinyl compound/inert fluid mixture is sufficiently high to prevent the catalyst particles from settling during storage and transport.

The adjustment of the viscosity of the mixture can be done either before or after the polymerization of the vinyl compound. It is, e. g., possible to carry out the polymerization in a low viscosity oil and after the polymerization of the vinyl compound the viscosity can be adjusted by addition of a highly viscous substance. Such highly viscous substance can be a "wax", such as an oil or a mixture of an oil with a solid or highly viscous substance (oil-grease). The viscosity of such a viscous substance is usually 1,000 to 15,000 cP at room temperature. The advantage of using wax is that the catalyst storing and feeding into the process is improved. Since no washing, drying, sieving and transferring are needed, the catalyst activity is maintained.

The weight ratio between the oil and the solid or highly viscous polymer is preferably less than 5:1.

In addition to viscous substances, liquid hydrocarbons, such as isobutane, propane, pentane and hexane, can also be used as a medium in the modification step.

The polypropylenes produced with a catalyst modified with polymerized vinyl compounds contain essentially no free (unreacted) vinyl compounds. This means that the vinyl compounds shall be completely reacted in the catalyst modification step. To that end, the weight ratio of the (added) vinyl compound to the catalyst should be in the range of 0.05 to 10, preferably less than 3, more preferably about 0.1 to 2.0, and in particular about 0.1 to 1.5. It should be noted that no benefits are achieved by using vinyl compounds in excess.

Further, the reaction time of the catalyst modification by polymerization of a vinyl compound should be sufficient to allow for complete reaction of the vinyl monomer, i.e. the polymerization is continued until the amount of unreacted vinyl compounds in the reaction mixture (including the polymerization medium and the reactants) is less than 0.5 wt %, in particular less than 2000 ppm by weight (shown by analysis). Thus, when the pre-polymerized catalyst contains a maximum of about 0.1 wt % vinyl compound, the final vinyl compound content in the polypropylene will be below the limit of determination using the GC-MS method (<0.01 ppm by weight). Generally, when operating on an industrial scale, a polymerization time of at least 30 minutes is required, preferably the polymerization time is at least 1 hour and in particular at least 5 hours. Polymerization times even in the range of 6 to 50 hours can be used. The modification can be done at temperatures of 10 to 60° C., preferably 15 to 55° C.

General conditions for the modification of the catalyst are also disclosed in WO 00/6831, incorporated herein by reference with respect to the modification of the polymerization catalyst. The preferred embodiments as described previously in the present application with respect to the vinyl compound also apply with respect to the polymerization catalyst of the present invention and the preferred polypropylene composition in accordance with the present invention.

Suitable media for the modification step include, in addition to oils, also aliphatic inert organic solvents with low viscosity, such as pentane and heptane. Furthermore, small amounts of hydrogen can be used during the modification.

Therefore a process for the production of a heterophasic propylene copolymer (HECO) of the present invention is also an object of the present invention. Such a process comprises polymerizing propylene in at least 2 subsequent polymerization steps in the presence of a) a Ziegler-Natta catalyst comprising compounds (TC) of a transition metal of Group 4 to 6 of IUPAC, a Group 2 metal compound and an internal donor, b) a co-catalyst (Co), and c) optionally an external donor (ED).

Component (B) Propylene-Hexene Random Copolymer

The propylene-hexene random copolymer has an hexene content in the range of from 2.0 to 10.0 wt %, preferably in the range of from 2.5 to 8.0 wt % and more preferably in the range of from 3.0 to 6.0 wt %.

The $MFR_2$ (230° C., 2.16 kg, ISO1133) of the propylene-hexene random copolymer is in the range of from 1.0 to 20.0 g/10 min, preferably in the range of from 5.0 to 20.0 g/10 min, more preferably in the range of from 8.0 to 20.0 g/10 min and yet more preferably in the range of from 10.0 to 20.0 g/10 min.

The melting temperature Tm of the propylene-hexene random copolymer is in the range of from 120° C. to 140° C., preferably in the range of from 120° C. to 135° C. and more preferably in the range of 125° C. to 135° C.

Preferably the propylene-hexene random copolymer has a molecular weight distribution (Mw/Mn) in the range of 2.0 to 5.0 and more preferably in the range of 2.5 to 4.5.

Additionally or alternatively to the molecular weight distribution (Mw/Mn) as defined in the previous paragraph the propylene-hexene random copolymer has preferably weight average molecular weight Mw in the range of 120 to 500 kg/mol, more preferably in the range of 130 to 400 kg/mol, like in the range of 135 to 300 kg/mol.

Equally preferably the propylene-hexene random copolymer has a low amount of xylene cold soluble (XCS) fraction of less than 3.0 wt %, more preferably in the range of 0.2 to 2.5 wt %.

The propylene-hexene random copolymer as described above is obtainable, preferably obtained, in the presence of a metallocene catalyst.

The metallocene catalyst can be a supported catalyst, using conventional supports or can be free from an external carrier. By free from an external carrier is meant that the catalyst does not contain an external support, such as an inorganic support, for example, silica or alumina, or an organic polymeric support material Preferably used are metallocene catalysts which are free from an external carrier.

More preferably the metallocene catalyst comprises (i) a complex of formula (I):

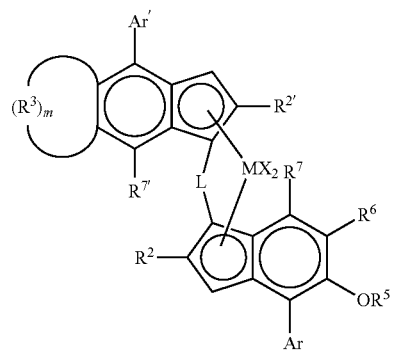

(I)

wherein

M is zirconium or hafnium;

each X independently is a sigma-donor ligand

L is a bridge of formula $-(ER^8_2)_y-$;

y is 1 or 2;

E is C or Si;

each $R^8$ is independently a $C_1$-$C_{20}$-hydrocarbyl or tri($C_1$-$C_{20}$-alkyl)silyl, or L is an alkylene group such as methylene or ethylene;

Ar and Ar' are each independently an aryl or heteroaryl group optionally substituted by 1 to 3 groups $R^1$ or $R^{1'}$ respectively;

$R^1$ and $R^{1'}$ are each independently the same or can be different and are a linear or branched $C_1$-$C_6$-alkyl group, $C_{7\text{-}20}$ arylalkyl, $C_{7\text{-}20}$ alkylaryl group or $C_{6\text{-}20}$ aryl group;

$R^2$ and $R^{2'}$ are the same or are different and are a $CH_2$—$R^9$ group, with $R^9$ being H or linear or branched $C_{1\text{-}6}$-alkyl group, $C_{3\text{-}8}$ cycloalkyl group, $C_{6\text{-}10}$ aryl group;

each $R^3$ is a —$CH_2$—, —$CHRx$- or $C(Rx)_2$- group wherein Rx is C1-4 alkyl and where m is 2-6;

$R^5$ is a linear or branched $C_1$-$C_6$-alkyl group, $C_{7\text{-}20}$ arylalkyl, $C_{7\text{-}20}$ alkylaryl group or $C_6$-$C_{20}$-aryl group;

$R^6$ is a $C(R^{10})_3$ group, with $R^{10}$ being a linear or branched $C_1$-$C_6$ alkyl group; and $R^7$ and $R^{7'}$ are the same or are different and are H or a linear or branched $C_1$-$C_6$-alkyl group and (ii) a cocatalyst comprising a compound of a group 13 metal, e.g. Al or boron compound.

Each X independently is a sigma-donor ligand.

Thus each X may be the same or different, and is preferably a hydrogen atom, a halogen atom, a linear or branched, cyclic or acyclic C1-20-alkyl or -alkoxy group, a C6-20-aryl group, a C7-20-alkylaryl group or a C7-20-arylalkyl group; optionally containing optionally containing one or more heteroatoms of Group 14-16 of the periodic table.

The term halogen includes fluoro, chloro, bromo and iodo groups, preferably chloro groups.

The term heteroatoms belonging to groups 14-16 of the periodic table includes for example Si, N, O or S.

More preferably each X is independently a hydrogen atom, a halogen atom, a linear or branched C1-6-alkyl or C1-6-alkoxy group, a phenyl or benzyl group.

Yet more preferably each X is independently a halogen atom, a linear or branched C1-4-alkyl or C1-4-alkoxy group, a phenyl or benzyl group.

Most preferably each X is independently chlorine, benzyl or a methyl group.

Preferably both X groups are the same.

The most preferred options for both X groups are two chlorides, two methyl or two benzyl groups.

L is a bridge of formula -$(ER^8{}_2)_y$-, with y being 1 or 2, E being C or Si, and each $R^8$ is independently a $C_1$-$C_{20}$-hydrocarbyl or tri($C_1$-$C_{20}$-alkyl)silyl, or L is an alkylene group such as methylene or ethylene.

The bridge -$(ER^8{}_2)_y$- is thus a methylene or ethylene linker or L is a bridge of the formula —$SiR^8{}_2$—, wherein each $R_8$ is independently a $C_1$-$C_{20}$-hydrocarbyl or tri($C_1$-$C_{20}$-alkyl)silyl.

The term $C_{1\text{-}20}$-hydrocarbyl group includes $C_{1\text{-}20}$-alkyl, $C_{2\text{-}20}$-alkenyl, $C_{2\text{-}20}$-alkynyl, $C_{3\text{-}20}$-cycloalkyl, $C_{3\text{-}20}$-cycloalkenyl, $C_{6\text{-}20}$-aryl groups, $C_{7\text{-}20}$-alkylaryl groups or $C_{7\text{-}20}$-arylalkyl groups or of course mixtures of these groups such as cycloalkyl substituted by alkyl. Unless otherwise stated, preferred $C_{1\text{-}20}$-hydrocarbyl groups are $C_{1\text{-}20}$-alkyl, $C_{4\text{-}20}$-cycloalkyl, $C_{5\text{-}20}$-cycloalkyl-alkyl groups, $C_{7\text{-}20}$-alkylaryl groups, $C_{7\text{-}20}$-arylalkyl groups or $C_{6\text{-}20}$-aryl groups.

If L is an alkylene linker group, ethylene and methylene are preferred.

It is preferred if $R^8$ is a $C_1$-$C_{10}$-hydrocarbyl, such as methyl, ethyl, propyl, isopropyl, tert.-butyl, isobutyl, $C_{5\text{-}6}$-cycloalkyl, cyclohexylmethyl, phenyl or benzyl, more preferably both $R^8$ are a $C_1$-$C_6$-alkyl, $C_{3\text{-}8}$-cycloalkyl or $C_6$-aryl group, such as a $C_1$-$C_4$-alkyl, $C_{5\text{-}6}$-cycloalkyl or $C_6$-aryl group and most preferably both $R^8$ are methyl or one is methyl and another cyclohexyl. Preferably both $R^8$ groups are the same.

Alkylene linkers are preferably methylene or ethylene.

L is most preferably —$Si(CH_3)_2$—.

Ar and Ar' are each independently a $C_6$-$C_{10}$-aryl or $C_5$-$C_{10}$-heteroaryl group optionally substituted by 1 to 3 groups $R^1$ or $R^{1'}$ respectively.

Preferably Ar and Ar' are each independently a $C_6$-$C_{10}$-aryl group and more preferably both Ar and Ar' are phenyl.

In a preferred embodiment the each of the groups Ar and Ar' is independently substituted by 1 or by 2 groups $R^1$ or $R^{1'}$ $R^1$ and $R^{1'}$ are each independently the same or can be different and are a linear or branched $C_1$-$C_6$-alkyl group, $C_{7\text{-}20}$-arylalkyl, $C_{7\text{-}20}$alkylaryl group or $C_{6\text{-}20}$ aryl group.

Preferably $R^1$ and $R^{1'}$ are each independently the same or can be different and are a linear or branched $C_1$-$C_6$-alkyl group or $C_{6\text{-}20}$ aryl groups, more preferably a linear or branched C1-C4- alkyl group.

Most preferably each $R^1$ and each $R^{1'}$ are independently methyl, ethyl, isopropyl or tert.-butyl, especially methyl or tert.-butyl.

Preferably each $R^1$ is the same and each $R^1$ is the same.

The total of the two $R^1$ and $R^{1'}$ substituents is ideally 2, 3 or 4.

For the preferred case that Ar and Ar' are phenyl, the ring is preferably substituted with the group $R^1$ or $R^{1'}$ at the para position (4 or 4' position), if there is only one substituent on the phenyl ring.

When there are 2 substituents on the ring, the ring is preferably substituted with the groups $R^1$ or $R^{1'}$ at the ortho positions (3 and 5, or 3' and 5' positions).

Ideally, no phenyl ring will comprise two branched substituents. If a phenyl ring contains two substituents, then it is preferred if $R^1$ or $R^{1'}$ is C1-4 linear alkyl, e.g. methyl.

If a phenyl ring contains one substituent, then it is preferred that $R^1$ or $R^{1'}$ is a branched $C_{4\text{-}6}$ alkyl, e.g. tert butyl.

$R^2$ and $R^{2'}$ are the same or are different and are a $CH_2$—$R^9$ group, with $R^9$ being H or linear or branched $C_{1\text{-}6}$-alkyl group, like methyl, ethyl, n-propyl, i-propyl, n-butyl, i-butyl, sec.-butyl and tert.-butyl or $C_{3\text{-}8}$cycloalkyl group (e.g. cyclohexyl), $C_{6\text{-}10}$ aryl group (e.g. phenyl).

Preferably $R^2$ and $R^{2'}$ are the same and are a $CH_2$—$R^9$ group, with $R^9$ being H or linear or branched $C_1$-$C_4$-alkyl group, more preferably $R^2$ and $R^{2'}$ are the same and are a $CH_2$—$R^9$ group, with $R^9$ being H or linear or branched $C_1$-$C_3$-alkyl group. Most preferably $R^2$ and $R^{2'}$ are both methyl.

Each $R^3$ is a —$CH_2$—, —CHRx- or $C(Rx)_2$- group wherein Rx is C1-4 alkyl and m is 2-6.

$R^3$ is preferably —$CH_2$—. The subscript m is preferably 2 to 4, such as 3 (thus forming a 5 membered ring).

$R^5$ is a linear or branched $C_1$-$C_6$-alkyl group, $C_{7\text{-}20}$ arylalkyl, $C_{7\text{-}20}$ alkylaryl group or $C_6$-$C_{20}$-aryl group.

$R^5$ is a preferably linear or branched $C_1$-$C_6$-alkyl group or $C_{6\text{-}20}$ aryl group, such as methyl, ethyl, n-propyl, i-propyl, n-butyl, i-butyl, sec.-butyl and tert.-butyl, preferably a linear $C_1$-$C_4$-alkyl group, more preferably a $C_1$-$C_2$-alkyl group and most preferably methyl.

$R^6$ is a $C(R^{10})_3$ group, with $R^{10}$ being a linear or branched $C_1$-$C_6$ alkyl group, whereby each $R_{10}$ can be the same or different. Preferably each $R^{10}$ is the same or different with $R^{10}$ being a linear or branched $C_1$-$C_4$-alkyl group, more preferably with $R^1$ being the same and being a $C_1$-$C_2$-alkyl group. Most preferably $R^6$ is a tert.-butyl group and hence all $R^{10}$ groups are methyl.

$R^7$ and $R^{7'}$ are the same or are different and are H or a linear or branched $C_1$-$C_6$-alkyl group. Preferably $R^7$ and $R^{7'}$ are the same or are different and are H or a linear or branched $C_1$-$C_4$-alkyl group, and more preferably H or a $C_1$-$C_2$-alkyl group. In some embodiments one of $R^7$ or $R^{7'}$ is H and the other is a linear or branched $C_1$-$C_6$-alkyl group, preferably a linear or branched $C_1$-$C_4$-alkyl group and more preferably a $C_1$-$C_2$-alkyl group. It is especially preferred that $R^7$ and $R^{7'}$ are the same. It is most preferred that both $R^7$ and $R^{7'}$ are H.

The term $C_{1\text{-}20}$ hydrocarbyl group includes $C_{1\text{-}20}$ alkyl, $C_{2\text{-}20}$ alkenyl, $C_{2\text{-}20}$ alkynyl, $C_{3\text{-}20}$ cycloalkyl, $C_{3\text{-}20}$ cycloalkenyl, $C_{6\text{-}20}$ aryl groups, $C_{7\text{-}20}$ alkylaryl groups or $C_{7\text{-}20}$ arylalkyl groups or of course mixtures of these groups such as cycloalkyl substituted by alkyl.

Unless otherwise stated, preferred $C_{1\text{-}20}$ hydrocarbyl groups are $C_{1\text{-}20}$ alkyl, $C_{4\text{-}20}$ cycloalkyl, $C_{5\text{-}20}$ cycloalkyl-alkyl groups, $C_{7\text{-}20}$ alkylaryl groups, $C_{7\text{-}20}$ arylalkyl groups or $C_{6\text{-}20}$ aryl groups, especially $C_{1\text{-}10}$ alkyl groups, $C_{6\text{-}10}$ aryl groups, or $C_{7\text{-}12}$ arylalkyl groups, e.g. $C_{1\text{-}8}$ alkyl groups. Most especially preferred hydrocarbyl groups are methyl, ethyl, propyl, isopropyl, tertbutyl, isobutyl, $C_{5\text{-}6}$-cycloalkyl, cyclohexylmethyl, phenyl or benzyl.

The term halo includes fluoro, chloro, bromo and iodo groups, especially chloro groups, when relating to the complex definition.

The oxidation state of the metal ion is governed primarily by the nature of the metal ion in question and the stability of the individual oxidation states of each metal ion.

It will be appreciated that in the complexes of the invention, the metal ion M is coordinated by ligands X so as to satisfy the valency of the metal ion and to fill its available coordination sites. The nature of these σ-ligands can vary greatly.

In an even more preferred embodiment, the invention provides a complex of formula (II)

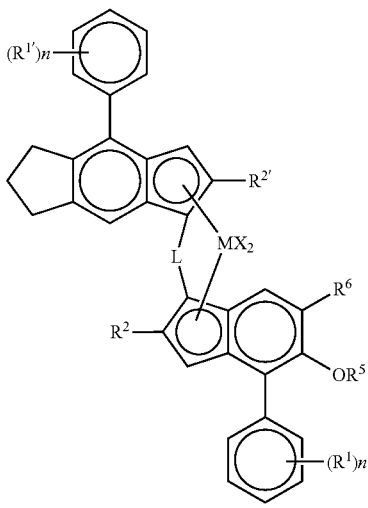

(II)

wherein
M is Hf or Zr;
X is a sigma-donor ligand, preferably each X is independently a hydrogen atom, a halogen atom, $C_{1-6}$ alkoxy group, $C_{1-6}$ alkyl, phenyl or benzyl group;
L is an alkylene bridge or a bridge of the formula —$SiR^8{}_2$—, wherein each $R^8$ is independently $C_1$-$C_6$-alkyl, $C_{3-8}$ cycloalkyl or $C_6$-aryl group;
each n is independently 1 or 2;
$R^1$ and $R^{1'}$ are each independently the same or can be different and are a linear or branched $C_1$-$C_6$-alkyl group;
$R^2$ and $R^{2'}$ are the same or are different and are a $CH_2$—$R^9$ group, with $R^9$ being H or linear or branched $C_{1-6}$-alkyl group;
$R^5$ is a linear or branched $C_1$-$C_6$-alkyl group; and
$R^6$ is a $C(R^{10})_3$ group, with $R^{10}$ being a linear or branched C1-C alkyl group.

In any of formula (I) to (II) it is preferred if the 4-position substituent on either indenyl or indacenyl ring is a 3,5-dimethylphenyl- or a 4-tBu-phenyl group.

In formula (II) it is preferred that if n=2 then both $R^1$ groups are the same.

In formula (II) it is preferred that if n=2 then both $R^{1'}$ groups are the same.

In formula (II) it is preferred that if n=2 then $R^1$ groups are on the 3,5-position.

In formula (II) it is preferred that if n=2 then $R^{1'}$ groups are on the 3,5-position.

In of formula (II) it is preferred that if n=1 then $R^1$ is on the 4-position.

In of formula (II) it is preferred that if n=1 then $R^{1'}$ is on the 4-position.

Particular complexes of the invention include:
Racemic-anti-dimethylsilanediyl[2-methyl-4-(4-tert-butylphenyl)-5,6,7-trihydro-s-indacen-1-yl][2-methyl-4-(4-tert-butylphenyl)-5-methoxy-6-tert-butylindenyl zirconium dichloride or dimethyl,
Racemic-anti-dimethylsilanediyl[2-iso-butyl-4-(4-tert-butylphenyl)-5,6,7-trihydro-s-indacen-1-yl][2-methyl-4-(4-tert-butylphenyl)-5-methoxy-6-tert-butylindenyl zirconium dichloride or dimethyl,
Racemic-anti-dimethylsilanediyl[2-neo-pentyl-4-(4-tert-butylphenyl)-5,6,7-trihydro-s-indacen-1-yl][2-methyl-4-(4-tert-butylphenyl)-5-methoxy-6-tert-butylindenyl zirconium dichloride or dimethyl,
Racemic-anti-dimethylsilanediyl[2-benzyl-4-(4-tert-butylphenyl)-5,6,7-trihydro-s-indacen-1-yl][2-methyl-4-(4-tert-butylphenyl)-5-methoxy-6-tert-butylindenyl zirconium dichloride or dimethyl,
Racemic-anti-dimethylsilanediyl[2-cyclohexylmethyl-4-(4-tert-butylphenyl)-5,6,7-trihydro-s-indacen-1-yl][2-methyl-4-(4-tert-butylphenyl)-5-methoxy-6-tert-butylindenyl zirconium dichloride or dimethyl,
Racemic-anti-dimethylsilanediyl[2-methyl-4-(3,5-dimethylphenyl)-5,6,7-trihydro-s-indacen-1-yl][2-methyl-4-(3,5-dimethylphenyl)-5-methoxy-6-tert-butylindenyl zirconium dichloride or dimethyl,
Racemic-anti-dimethylsilanediyl[2-iso-butyl-4-(3,5-dimethylphenyl)-5,6,7-trihydro-s-indacen-1-yl][2-methyl-4-(3,5-dimethylphenyl)-5-methoxy-6-tert-butylindenyl zirconium dichloride or dimethyl,
Racemic-anti-dimethylsilanediyl[2-neo-pentyl-4-(3,5-dimethylphenyl)-5,6,7-trihydro-s-indacen-1-yl][2-methyl-4-(3,5-dimethylphenyl)-5-methoxy-6-tert-butylindenyl zirconium dichloride or dimethyl,
Racemic-anti-dimethylsilanediyl[2-benzyl-4-(3,5-dimethylphenyl)-5,6,7-trihydro-s-indacen-1-yl][2-methyl-4-(3,5-dimethylphenyl)-5-methoxy-6-tert-butylindenyl zirconium dichloride or dimethyl,
Racemic-anti-dimethylsilanediyl[2-cyclohexylmethyl-4-(3,5-dimethylphenyl)-5,6,7-trihydro-s-indacen-1-yl][2-methyl-4-(3,5-dimethylphenyl)-5-methoxy-6-tert-butylindenyl zirconium dichloride or dimethyl, The catalyst preferably used to produce the propylene-hexene random copolymer used in the invention is in solid particulate form. As mentioned above it can be supported on a conventional carrier know to an art skilled person. Preferably the used catalyst is free from an external carrier.

Ideally, the catalyst is obtainable by a process in which (a) a liquid/liquid emulsion system is formed, said liquid/liquid emulsion system comprising a solution of the catalyst components (i) and (ii) dispersed in a solvent so as to form dispersed droplets; and (b) solid particles are formed by solidifying said dispersed droplets.

The ligands required to form the complexes and hence catalysts of the invention can be synthesised by any process and the skilled organic chemist would be able to devise various synthetic protocols for the manufacture of the necessary ligand materials. For Example WO2007/116034 discloses the necessary chemistry. Synthetic protocols can also generally be found in WO2002/02576, WO2011/135004, WO2012/084961, WO2012/001052, WO2011/076780 and WO2015/158790. The examples section also provides the skilled person with sufficient direction.

For example, the following general synthetic scheme can be used:

Scheme 1

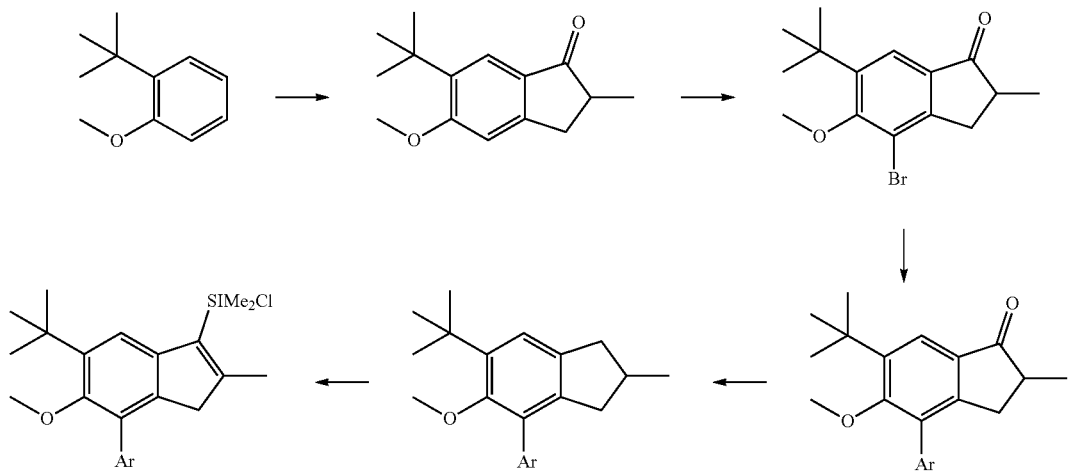

Suitable reagents for this transformation are given in the examples section.

Whilst this scheme refers to specific compounds, the general principles displayed here apply to all of the metallocenes described above. If the ligands are asymmetric, a conventional reaction with SiMe$_2$Cl$_2$ cannot be effected to bridge two ligands as that leads to symmetrical products. Instead, each ligand has to be attached to the bridge stepwise with control over the reaction stoichiometry.

Cocatalyst

To form an active catalytic species it is normally necessary to employ a cocatalyst as is well known in the art. Cocatalysts comprising one or more compounds of Group 13 metals, like organoaluminium compounds or borates used to activate metallocene catalysts are suitable for use in this invention. Thus the cocatalyst is preferably an alumoxane, like MAO. Borate cocatalysts can also be employed. The use of B(C$_6$F$_5$)$_3$, C$_6$H$_5$N(CH$_3$)$_2$H:B(C$_6$F$_5$)$_4$, (C$_6$H$_5$)$_3$C:B(C$_6$F$_5$)$_4$ or Ni(CN)$_4$[B(C$_6$F$_5$)$_3$]$_4^{2-}$ is especially preferred. Suitable cocatalysts are described in WO2013/007650.

Suitable amounts of cocatalyst will be well known to the skilled man.

Manufacture

The catalyst used to manufacture the heterophasic copolymers of the invention is ideally provided in solid particulate form but unsupported, i.e. no external carrier is used. In order to provide the catalyst of the invention in solid form but without using an external carrier, it is preferred if a liquid liquid emulsion system is used. The process involves forming dispersing catalyst components (i) and (ii) in a solvent, and solidifying said dispersed droplets to form solid particles.

In particular, the method involves preparing a solution of one or more catalyst components; dispersing said solution in an solvent to form an emulsion in which said one or more catalyst components are present in the droplets of the dispersed phase; immobilising the catalyst components in the dispersed droplets, in the absence of an external particulate porous support, to form solid particles comprising the said catalyst, and optionally recovering said particles.

This process enables the manufacture of active catalyst particles with improved morphology, e.g. with a predetermined spherical shape and particle size and without using any added external porous support material, such as an inorganic oxide, e.g. silica. Also desirable surface properties can be obtained. WO2013/007650 again contains comprehensive details of this process.

Catalyst Prepolymerization

The use of the heterogeneous, non-supported catalysts, (i.e. "self-supported" catalysts) might have, as a drawback, a tendency to dissolve to some extent in the polymerization media, i.e. some active catalyst components might leach out of the catalyst particles during slurry polymerization, whereby the original good morphology of the catalyst might be lost. These leached catalyst components are very active possibly causing problems during polymerization. Therefore, the amount of leached components should be minimized, i.e. all catalyst components should be kept in heterogeneous form.

Furthermore, the self-supported catalysts generate, due to the high amount of catalytically active species in the catalyst system, high temperatures at the beginning of the polymerization which may cause melting of the product material. Both effects, i.e. the partial dissolving of the catalyst system and the heat generation, might cause fouling, sheeting and deterioration of the polymer material morphology.

In order to minimise the possible problems associated with high activity or leaching, it is preferred to "prepolymerize" the catalyst before using it in polymerization process. It has to be noted that prepolymerization in this regard is part of the catalyst preparation process, being a step carried out after a solid catalyst is formed. This catalyst prepolymerization step is not part of the actual polymerization configuration, which might comprise a conventional process prepolymerization step as well. After the catalyst prepolymerization step, a solid catalyst is obtained and used in polymerization.

Catalyst "prepolymerization" takes place following the solidification step of the liquid-liquid emulsion process hereinbefore described. Prepolymerization may take place by known methods described in the art, such as that described in WO 2010/052263, WO 2010/052260 or WO 2010/052264. Preferable embodiments of this aspect of the invention are described herein.

As monomers in the catalyst prepolymerization step preferably alpha-olefins are used. Preferable C$_2$-C$_{10}$ olefins, such as ethylene, propylene, 1-butene, 1-pentene, 1-hexene, 4-methyl-1-pentene, 1-heptene, 1-octene, 1-nonene 1-decene, styrene and vinylcyclohexene are used. Most preferred alpha-olefins are ethylene and propylene.

The catalyst prepolymerization may be carried out in gas phase or in an inert diluent, typically oil or fluorinated hydrocarbon, preferably in fluorinated hydrocarbons or mixture of fluorinated hydrocarbons. Preferably perfluorinated hydrocarbons are used. The melting point of such (per) fluorinated hydrocarbons is typically in the range of 0° C. to 140° C., preferably 30° C. to 120° C., like 50° C. to 110° C.

Where the catalyst prepolymerization is done in fluorinated hydrocarbons, the temperature for the prepolymerization step is below 70° C., e.g. in the range of from −30° C. to 70° C., preferably from 0° C. to 65° C. and more preferably in the range of from 20° C. to 55° C.

Pressure within the prepolymerization vessel is preferably higher than atmospheric pressure to minimize the eventual leaching of air and/or moisture into the catalyst vessel. Preferably the pressure is in the range of at least 1 to 15 bar, preferably 2 to 10 bar. The prepolymerization vessel is preferably kept in an inert atmosphere, such as under nitrogen or argon or similar atmosphere.

Prepolymerization is continued until the prepolymerization degree defined as weight of polymer matrix/weight of solid catalyst before prepolymerization step is reached. The degree is below 25, preferably 0.5 to 10.0, more preferably 1.0 to 8.0, most preferably 2.0 to 6.0.

Use of the catalyst prepolymerization step offers the advantage of minimising leaching of catalyst components and thus local overheating.

After prepolymerization, the catalyst can be isolated and stored.

The propylene-hexene random copolymer can be produced in a single polymerization step comprising a single polymerization reactor (R1) or in a sequential polymerization process comprising at least two polymerization reactors (R1) and (R2), whereby in the first polymerization reactor (R1) a first propylene copolymer fraction (R-PP1) is produced, which is subsequently transferred into the second polymerization reactor (R2). In the second polymerization reactor (R2) a second propylene copolymer fraction (R-PP2) is produced in the presence of the first propylene copolymer fraction (R-PP1).

Polymerization processes which are suitable for producing the propylene-hexene random copolymer generally comprises at one or two polymerization stages and each stage can be carried out in solution, slurry, fluidized bed, bulk or gas phase.

The term "polymerization reactor" is defined as described above for Component (A)

The term "sequential polymerization process" is defined as described above for Component (A).

The first, respectively the single, polymerization reactor (R1) is preferably a slurry reactor and can be any continuous or simple stirred batch tank reactor or loop reactor operating in bulk or slurry. Bulk means a polymerization in a reaction medium that comprises of at least 60% (w/w) monomer. According to the present invention the slurry reactor is preferably a (bulk) loop reactor.

In case a "sequential polymerization process" is applied the second polymerization reactor (R2) and the optional third polymerization reactor (R3) are gas phase reactors (GPRs), i.e. a first gas phase reactor (GPR1) and a second gas phase reactor (GPR2). A gas phase reactor (GPR) according to this invention is preferably a fluidized bed reactor, a fast fluidized bed reactor or a settled bed reactor or any combination thereof.

A preferred multistage process is a "loop-gas phase"-process, such as developed by Borealis (known as BORSTAR® technology) described e.g. in patent literature, such as in EP 0 887 379, WO 92/12182, WO 2004/000899, WO 2004/111095, WO 99/24478, WO 99/24479 or in WO 00/68315.

A further suitable slurry-gas phase process is the Spheripol® process of Basell.

The propylene-hexene random copolymer can be unimodal or multimodal, like bimodal, in view of comonomer content and/or $MFR_2$.

If the propylene-hexene random copolymer is unimodal, it is preferably produced in a single polymerization step in one polymerization reactor (R1). Alternatively a unimodal propylene-hexene random copolymer can be produced in a sequential polymerization process using the same polymerization conditions in all reactors.

If the propylene-hexene random copolymer is multimodal, it is preferably produced in a sequential polymerization process using different polymerization conditions (amount of comonomer, hydrogen amount, etc.) in the reactors.

Preferably the propylene-hexene random copolymer used according to the present invention is unimodal.

The propylene-hexene random copolymer as defined in the instant invention may contain up to 5.0 wt % additives, like α-nucleating agents and antioxidants, as well as slip agents and antiblocking agents. Preferably the additive content (without α-nucleating agents) is below 3.0 wt %, like below 1.0 wt %.

Polypropylene Composition

The polypropylene composition according to this invention can be obtained by (melt)-mixing the individual fractions, i.e. heterophasic propylene copolymer (HECO) (A) and propylene-hexene random copolymer (B). During the melt mixing suitable additives can additionally be added. For mixing, a conventional compounding or blending apparatus, e.g. a Banbury mixer, a 2-roll rubber mill, Buss-co-kneader, a single screw extruder with special mixing segments or a twin screw extruder may be used. The polymer composition recovered from the extruder is usually in the form of pellets.

In the blend for the polypropylene composition according to this invention component (A) is present in an amount of from 85.0 to 95.0 wt % and component (B) is present in an amount of from 5.0 to 15.0 wt %.

Preferably component (A) is present in an amount of from 87.0 to 93.0 wt % and more preferably in an amount of from 88.0 to 92.0 wt %.

Thus component (B) is preferably present in an amount of from 7.0 to 13.0 wt % and more preferably in an amount of from 8.0 to 12.0 wt %.

The overall melt flow rate, i.e. the melt flow rate $MFR_2$ (230° C.) measured according to ISO 1133 of polypropylene composition is in a range of from 1.0 to 15.0 g/10 min, preferably in a range of from 1.2 g/10 min to 10.0 g/10 min, more preferably in a range of from 1.5 g/10 min to 8.0 g/10 min and even more preferably in a range of from 2.0 to 6.0 g/10 min.

It is appreciated that the inventive polypropylene composition has a melting temperature in the range of from 155° C. to 170° C., preferably in the range of from 160° C. to 169° C., and more preferably in the range of from 162° C. to 168° C.

Additionally it is appreciated that the inventive polypropylene composition has a crystallization temperature of more than 120° C., preferably in the range of from 121° C. to 135° C. and more preferably in the range of from 122° C. to 132° C.

The polypropylene composition according to the present invention has a total hexene content of from 0.1 to 1.5 wt %, preferably in the range of 0.2 to 1.2 wt % and more preferably in the range of 0.3 to 1.0 wt %.

The polypropylene composition according to the present invention has a total ethylene content of from 1.5 to 6.2 wt %, preferably in the range of 2.0 to 5.5 wt % and more preferably in the range of 2.5 to 5.0 wt %.

Furthermore the inventive polypropylene composition is characterized by a low level of hexane solubles. Thus the inventive polypropylene composition has a hexane soluble value determined according to FDA method (federal registration, title 21, Chapter 1, part 177, section 1520, s. Annex B) on cast films of 100 µm of ≤3.0 wt %, preferably below 2.0 wt %, more preferably below 1.8 wt % and even more preferably below 1.6 wt %.

The amount of xylene cold soluble (XCS) fraction of the instant polypropylene composition is in the range of from 8.0 to 21.0 wt % (determined at 25° C. according ISO 16152; 2005), preferably in the range of from 10.0 to 19.0 wt % and more preferably in the range from 11.0 to 17.0 wt %.

In one embodiment of the present invention, the polypropylene composition has
i) a flexural modulus measured according to ISO 178 in the range of 1000 to 1800 MPa,
ii) a Charpy notched impact strength NIS+23° C. according to ISO 179 1eA in the range of from 25 to 75 kJ/m$^2$, and
iii) a Charpy notched impact strength NIS −20° C. according to ISO 179 1eA in the range of from 1.5 to 5.0 kJ/m$^2$ Preferably the flexural modulus measured according to ISO 178 in the range of 1100 to 1600 MPa, more preferably in the range of 1200 to 1500 MPa.

The Charpy notched impact strength NIS+23° C. according to ISO 179 1eA is preferably in the range of 28 to 65 kJ/m$^2$, more preferably in the range of 31 to 55 kJ/m$^2$.

The Charpy notched impact strength NIS −20° C. according to ISO 179 1eA is preferably in the range of 1.7 to 4.8 kJ/m$^2$, 2, more preferably in the range of 1.9 to 4.6 kJ/m$^2$.

In addition, the propylene composition according to the present invention has a haze according to ASTM D 1003-00 measured on a 1 mm thick injection molded specimen of s 50.0%, preferably in the range of 10.0 to 50.0% and more preferably in the range of 15.0 to 45.0%.

The polypropylene composition as defined in the instant invention may contain up to 5.0 wt % additives, like α-nucleating agents and antioxidants, as well as slip agents and antiblocking agents. Preferably the additive content (without α-nucleating agents) is below 3.0 wt %, like below 1.0 wt %.

The present invention is further directed to
a process for the preparation of the polypropylene composition as define above, the process comprising the steps of
(i) preparing the heterophasic propylene copolymer (A) in the presence of a Ziegler-Natta catalyst
(ii) preparing the propylene-hexene random copolymer (B) by polymerizing propylene and hexene in the presence of a metallocene catalyst
(iii) mixing said heterophasic propylene copolymer (A) with the propylene-hexene random copolymer (B) to obtain a mixture of (A) and (B) and
(iv) extruding said mixture to obtain the blend of (A) and (B).

Applications

The present invention is not only directed to the instant polypropylene composition but also the use of the polypropylene composition for preparing articles and the articles comprising the polypropylene composition.

Suitable articles are films for flexible packaging systems, such as bags or pouches for food and pharmaceutical packaging or medical articles in general.

In an embodiment the present invention is related also to unoriented films and film layers of multi-layer film constructions comprising the inventive polypropylene composition. Accordingly the present invention is also directed to unoriented films, like cast films or blown films, e.g. air cooled blown films, comprising at least 90 wt %, preferably comprising at least 95 wt %, yet more preferably comprising at least 99 wt %, of the instant polypropylene composition.

It has been found that such polypropylene composition according to the present invention provides the film material made thereof with an optimized or improved balance between mechanical properties, beneficial optical properties, low amounts of extractable substances and sufficient thermal stability to enable sterilization treatment, by which the optical properties are kept on a high level before and after sterilization.

Thus films, respectively articles according to the present invention comprising the above defined polypropylene composition are suitable for being sterilized without negatively affecting the optical properties.

Therefore the present invention is also directed to a sterilizable or sterilized article, preferably to a sterilizable or sterilized film, like a sterilizable or sterilized film. More preferably the invention is directed to containers, i.e. pouches, especially to steam sterilizable or steam sterilized containers, i.e. pouches, preferably comprising, more preferably consisting of, the film as defined herein. The container is in particular a pouch. Further said container, i.e. pouch, has been preferably subjected to a steam sterilization treatment in a temperature range of about 120° C. to 130° C.

Furthermore such an unoriented film comprising the inventive polypropylene composition shall preferably have a haze (before sterilization) determined on a 50 µm cast film (haze$_{b.s.}$) of below 10.0%, more preferably of below 9.0% and even more preferably of below 8.0%.

The films according to the invention furthermore have a haze value (determined on 50 µm cast film) after sterilization (haze$_{a.s.}$) at 121° C. for 30 min of below 15.0%, preferably of below 12.0% and even more more preferably of below 8.0%.

It is thus also preferred that an unoriented film comprising the inventive polypropylene composition shows only very limited haze increase after sterilization at 121° C. for 30 min. The Δ(haze), defined as Δ(haze)=(haze$_{a.s.}$−haze$_{b.s.}$)/haze$_{b.s.}$*100%, is thus preferably below 10%, more preferably below 5%.

In an embodiment of the present invention such unoriented films have a tensile modulus in machine (MD) direction determined acc. to ISO 527-3 on a 50 µm cast film in a range of from 750 to 1500 MPa, preferably in the range of 800 to 1400 MPa and more preferably in the range of from 850 to 1300 MPa.

A multi-layer film construction comprising at least one layer comprising the inventive polypropylene composition is preferably produced by multi-layer co-extrusion followed by film casting or film blowing. In this case, at least one of the outermost layers of said multi-layer film construction serving as sealing layer(s) shall comprise the inventive polypropylene composition as defined above. The inventive multilayer film construction shall preferably have a thickness in the range of 30 to 500 µm, more preferably in the range of 50 to 400 µm, like in the range of 60 to 300 µm. The sealing layer(s) comprising the inventive polypropylene composition shall preferably have a thickness in the range of 3 to 50 µm, more preferably in the range of 5 to 30 µm, like in the range of 8 to 25 µm.

Films and/or multi-layer film constructions according to the present invention shall preferably be used for flexible packaging systems, such as bags or pouches for food and pharmaceutical packaging or medical articles in general.

In case a film is produced by cast film technology the molten polypropylene composition is extruded through a slot extrusion die onto a chill roll to cool the polypropylene composition to a solid film. Typically the polypropylene composition is firstly compressed and liquefied in an extruder, it being possible for any additives to be already added to the polypropylene composition or introduced at this stage via a masterbatch. The melt is then forced through a flat-film die (slot die), and the extruded film is taken off on one or more take-off rolls, during which it cools and solidifies. It has proven particularly favorable to keep the take-off roll or rolls, by means of which the extruded film is cooled and solidified, at a temperature from 10° C. to 50° C., preferably from 15° C. to 40° C.

In the blown film process the polypropylene composition melt is extruded through an annular die and blown into a tubular film by forming a bubble which is collapsed between nip rollers after solidification. The blown extrusion can be preferably effected at a temperature in the range 160° C. to 240° C., and cooled by water or preferably by blowing gas (generally air) at a temperature of 10° C. to 50° C. to provide a frost line height of 0.5 to 8 times the diameter of the die. The blow up ratio should generally be in the range of from 1.5 to 4, such as from 2 to 4, preferably 2.5 to 3.5.

Methods

The Xylene Soluble Fraction at Room Temperature (XCS, Wt %):

The amount of the polymer soluble in xylene is determined at 25° C. according to ISO 16152; 2005;

Intrinsic Viscosity (IV of XCS)

Intrinsic viscosity (IV of XCS) is measured according to DIN ISO 1628/1, October 1999 (in Decalin at 135° C.) on the xylene soluble fraction (XCS).

$MFR_2$ (230° C.) is measured according to ISO 1133 (230° C., 2.16 kg load)

The melt flow rate is measured as the $MFR_2$ in accordance with ISO 1133 15 (230° C., 2.16 kg load) for polypropylene. The MFR is an indication of the flowability, and hence the processability, of the polymer. The higher the melt flow rate, the lower the viscosity of the polymer.

Comonomer Determination by NMR Spectroscopy (C2 Determination)

Quantitative nuclear-magnetic resonance (NMR) spectroscopy was further used to quantify the comonomer content and comonomer sequence distribution of the polymers. Quantitative $^{13}C\{^{1}H\}$ NMR spectra were recorded in the solution-state using a Bruker Advance III 400 NMR spectrometer operating at 400.15 and 100.62 MHz for $^{1}H$ and $^{13}C$ respectively. All spectra were recorded using a $^{13}C$ optimized 10 mm extended temperature probehead at 125° C. using nitrogen gas for all pneumatics. Approximately 200 mg of material was dissolved in 3 ml of 1,2-tetrachloroethane-$d_2$ (TCE-$d_2$) along with chromium-(III)-acetylacetonate ($Cr(acac)_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatory oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimized tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6k) transients were acquired per spectra. Quantitative $^{13}C\{^{1}H\}$ NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950).

With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

The comonomer fraction was quantified using the method of Wang et. al. (Wang, W-J., Zhu, S., Macromolecules 33 (2000), 1157) through integration of multiple signals across the whole spectral region in the $^{13}C\{^{1}H\}$ spectra. This method was chosen for its robust nature and ability to account for the presence of regio-defects when needed. Integral regions were slightly adjusted to increase applicability across the whole range of encountered comonomer contents. For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$$E=0.5(S\beta\beta+S\beta\gamma+S\beta\delta+0.5(S\alpha\beta+S\alpha\gamma))$$

Through the use of this set of sites the corresponding integral equation becomes:

$$E=0.5(I_H+I_G+0.5(I_C+I_D))$$

using the same notation used in the article of Wang et. al. (Wang, W-J., Zhu, S., Macromolecules 33 (2000), 1157). Equations used for absolute propylene content were not modified.

The mole percent comonomer incorporation was calculated from the mole fraction:

$$E[\text{mol }\%]=100*fE$$

The weight percent comonomer incorporation was calculated from the mole fraction:

$$E[\text{wt }\%]=100*(fE*28.06)/((fE*28.06)+((1-fE)*42.08))$$

The comonomer sequence distribution at the triad level was determined using the analysis method of Kakugo et al. (Kakugo, M., Naito, Y., Mizunuma, K., Miyatake, T. Macromolecules 15 (1982) 1150). This method was chosen for its robust nature and integration regions slightly adjusted to increase applicability to a wider range of comonomer contents.

Comonomer Determination: Hexene Content—$^{13}$C NMR Spectroscopy

Quantitative $^{13}$C{$^1$H} NMR spectra recorded in the molten-state using a Bruker Avance III 500 NMR spectrometer operating at 500.13 and 125.76 MHz for $^1$H and $^{13}$C respectively. All spectra were recorded using a $^{13}$C optimized 7 mm magic-angle spinning (MAS) probehead at 180° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification. (Klimke, K., Parkinson, M., Piel, C., Kaminsky, W., Spiess, H. W., Wilhelm, M., Macromol. Chem. Phys. 2006; 207:382., Parkinson, M., Klimke, K., Spiess, H.W., Wilhelm, M., Macromol. Chem. Phys. 2007; 208:2128., Castignolles, P., Graf, R., Parkinson, M., Wilhelm, M., Gaborieau, M., Polymer 50 (2009) 2373). Standard single-pulse excitation was employed utilising the NOE at short recycle delays of 3 s (Klimke, K., Parkinson, M., Piel, C., Kaminsky, W., Spiess, H.W., Wilhelm, M., Macromol. Chem. Phys. 2006; 207: 382., Pollard, M., Klimke, K., Graf, R., Spiess, H.W., Wilhelm, M., Sperber, O., Piel, C., Kaminsky, W., Macromolecules 2004; 37:813.). and the RS-HEPT decoupling scheme (Filip, X., Tripon, C., Filip, C., J. Mag. Resn. 2005, 176, 239., Griffin, J. M., Tripon, C., Samoson, A., Filip, C., and Brown, S. P., Mag. Res. in Chem. 2007 45, S1, S198). A total of 16384 (16k) transients were acquired per spectra.

Quantitative $^{13}$C{$^1$H} NMR spectra were processed, integrated and relevant quantitative properties determined from the integrals. All chemical shifts are internally referenced to the methyl isotactic pentad (mmmm) at 21.85 ppm.

Characteristic signals corresponding to the incorporation of 1-hexene were observed and the comonomer content quantified in the following way.

The amount of 1-hexene incorporated in PHP isolated sequences was quantified using the integral of the αB4 sites at 44.2 ppm accounting for the number of reporting sites per comonomer:

$H=I\alpha B4/2$

The amount of 1-hexene incorporated in PHHP double consecutive sequences was quantified using the integral of the ααB4 site at 41.7 ppm accounting for the number of reporting sites per comonomer:

$HH=2*I\alpha\alpha B4$

When double consecutive incorporation was observed the amount of 1-hexene incorporated in PHP isolated sequences needed to be compensated due to the overlap of the signals αB4 and αB4B4 at 44.4 ppm:

$H=(I\alpha B4-2*I\alpha\alpha B4)/2$

The total 1-hexene content was calculated based on the sum of isolated and consecutively incorporated 1-hexene:

$H\text{total}=H+HH$

When no sites indicative of consecutive incorporation observed the total 1-hexen comonomer content was calculated solely on this quantity:

$H\text{total}=H$

Characteristic signals indicative of regio 2,1-erythro defects were observed (Resconi, L., Cavallo, L., Fait, A., Piemontesi, F., Chem. Rev. 2000, 100, 1253).

The presence of 2,1-erythro regio defects was indicated by the presence of the Pαβ (21e8) and Pαγ (21e6) methyl sites at 17.7 and 17.2 ppm and confirmed by other characteristic signals.

The total amount of secondary (2,1-erythro) inserted propene was quantified based on the αα21e9 methylene site at 42.4 ppm:

$P21=I\alpha\alpha 21e9$

The total amount of primary (1,2) inserted propene was quantified based on the main Sαα methylene sites at 46.7 ppm and compensating for the relative amount of 2,1-erythro, αB4 and ααB4B4 methylene unit of propene not accounted for (note H and HH count number of hexene monomers per sequence not the number of sequences):

$P12=I_S\alpha\alpha+2*P21+H+HH/2$

The total amount of propene was quantified as the sum of primary (1,2) and secondary (2,1-erythro) inserted propene:

$P\text{total}=P12+P21=I_S\alpha\alpha+3*I\alpha\alpha 21e9+(I\alpha B4-2*I\alpha\alpha B4)/2+I\alpha\alpha B4$ This simplifies to:

$P\text{total}=I_S\alpha\alpha+3*I\alpha\alpha 21e9+0.5*I\alpha B4$

The total mole fraction of 1-hexene in the polymer was then calculated as:

$fH=H\text{total}/(H\text{total}+P\text{total})$

The full integral equation for the mole fraction of 1-hexene in the polymer was:

$fH=(((I\alpha B4-2*I\alpha\alpha B4)/2)+(2*I\alpha\alpha B4))/((I_S\alpha\alpha+3*I\alpha\alpha 21e9+0.5*I\alpha B4)+((I\alpha B4-2*I\alpha\alpha B4)/2)+(2*I\alpha\alpha B4))$ This simplifies to:

$fH=(I\alpha B4/2+I\alpha\alpha B4)/(I_S\alpha\alpha+3*I\alpha\alpha 21e9+I\alpha B4+I\alpha\alpha B4)$ The total comonomer incorporation of 1-hexene in mole percent was calculated from the mole fraction in the usual manner:

$H[\text{mol \%}]=100*fH$

The total comonomer incorporation of 1-hexene in weight percent was calculated from the mole fraction in the standard manner:

$H[\text{wt \%}]=100*(fH*84.16)/((fH*84.16)+((1-fH)*42.08))$

DSC Analysis, Melting Temperature (Tm) and Crystallization Temperature (Tc):

measured with a TA Instrument Q2000 differential scanning calorimetry (DSC) on 5 to 7 mg samples. DSC is run according to ISO 11357/part 3/method C2 in a heat/cool/heat cycle with a scan rate of 10° C./min in the temperature range of −30° C. to +225° C.

Crystallization temperature and heat of crystallization (Hc) are determined from the cooling step, while melting temperature and heat of fusion (Hf) are determined from the second heating step.

The Hexane Soluble Fraction

The amount of hexane extractable polymer according to FDA method (federal registration, title 21, Chapter 1, part 177, section 1520, s. Annex B) was determined from films produced on a PM30 cast film extrusion line with about 220° C. melt temperature with L/D=20 and a screw diameter of 30 mm (feed zone 4 D long, 5.8 mm deep, compression zone 10 D long, metering zone 6 D long, 2.3 mm deep utilising a screen pack 36-400-900-400 mesh/cm$^2$.) A 200 mm die with a 0.55 to 0.60 mm die gap, screw speed: 50 r/min, and chill roll temperature of water: both rolls 40° C. (heating-cooling unit), Air gap: 0.5 mm, Air knife blower air supply: 1 bar. The film thickness is 100 µm.

The amount of hexane soluble polymer is determined according to FDA method (federal registration, title 21, Chapter 1, part 177, section 1520, s. Annex B) from the film samples prepared as described above. The extraction was performed at a temperature of 50° C. and an extraction time of 2 hours.

Flexural Modulus:

The flexural modulus was determined in 3-point-bending according to ISO 178 on 80×10×4 mm3 test bars injection molded at 23° C. in line with EN ISO 1873-2.

Charpy notched impact strength (NIS) was determined according to ISO 179 1eA at 23°, and at −20° C. by using an 80×10×4 mm3 test bars injection molded in line with EN ISO 1873-2.

Haze was determined according to ASTM D1003-00 on 60×60×1 mm$^3$ plaques injection molded in line with EN ISO 1873-2 using a melt temperature of 200° C. and on cast films of 50 µm thickness produced on a monolayer cast film line with a melt temperature of 220° C. and a chill roll temperature of 20° C.

Tensile Modulus

Tensile modulus in machine (MD) direction was determined acc. to ISO 527-3 on cast films with a thickness of 50 µm at a cross head speed of 100 mm/min.

Steam sterilization was performed in a Systec D series machine (Systec Inc., USA). The samples were heated up at a heating rate of 5° C./min starting from 23° C. After having been kept for 30 min at 121° C., they were removed immediately from the steam sterilizer and stored at room temperature until being processed further.

EXAMPLES

Component (A)

The catalyst used in the polymerization process for the heterophasic propylene copolymer (HECO) of the inventive example (IE1) and of CE1 and CE2 was prepared as described below and was used together with triethyl-aluminium (TEA) as co-catalyst and dicyclopentyl dimethoxy silane (donor D) as donor.

1a) Catalyst Preparation 3.4 litre of 2-ethylhexanol and 810 ml of propylene glycol butyl monoether (in a molar ratio 4/1) were added to a 20 l reactor. Then 7.8 litre of a 20% solution in toluene of BEM (butyl ethyl magnesium) provided by Crompton GmbH were slowly added to the well stirred alcohol mixture. During the addition the temperature was kept at 10° C. After addition the temperature of the reaction mixture was raised to 60° C. and mixing was continued at this temperature for 30 minutes. Finally after cooling to room temperature the obtained Mg-alkoxide was transferred to storage vessel.

21.2 g of Mg alkoxide prepared above was mixed with 4.0 ml bis(2-ethylhexyl) citraconate for 5 min. After mixing the obtained Mg complex was used immediately in the preparation of catalyst component.

19.5 ml titanium tetrachloride was placed in a 300 ml reactor equipped with a mechanical stirrer at 25° C. Mixing speed was adjusted to 170 rpm. 26.0 of Mg-complex prepared above was added within 30 minutes keeping the temperature at 25° C. 3.0 ml of Viscoplex 1-254 and 1.0 ml of a toluene solution with 2 mg Necadd 447 was added. Then 24.0 ml of heptane was added to form an emulsion. Mixing was continued for 30 minutes at 25° C. Then the reactor temperature was raised to 90° C. within 30 minutes. The reaction mixture was stirred for further 30 minutes at 90° C. Afterwards stirring was stopped and the reaction mixture was allowed to settle for 15 minutes at 90° C.

The solid material was washed 5 times: Washings were made at 80° C. under stirring 30 min with 170 rpm. After stirring was stopped the reaction mixture was allowed to settle for 20-30 minutes and followed by siphoning.

Wash 1: Washing was made with a mixture of 100 ml of toluene and 1 ml donor

Wash 2: Washing was made with a mixture of 30 ml of TiCl4 and 1 ml of donor.

Wash 3: Washing was made with 100 ml toluene.

Wash 4: Washing was made with 60 ml of heptane.

Wash 5. Washing was made with 60 ml of heptane under 10 minutes stirring.

Afterwards stirring was stopped and the reaction mixture was allowed to settle for 10 minutes decreasing the temperature to 70° C. with subsequent siphoning, and followed by N2 sparging for 20 minutes to yield an air sensitive powder.

1b) VCH Modification of the Catalyst 35 ml of mineral oil (Paraffinum Liquidum PL68) were added to a 125 ml stainless steel reactor followed by 0.82 g of triethyl aluminium (TEAL) and 0.33 g of dicyclopentyl dimethoxy silane (donor D) under inert conditions at room temperature. After 10 minutes 5.0 g of the catalyst prepared in 1a (Ti content 1.4 wt %) was added and after additionally 20 minutes 5.0 g of vinylcyclohexane (VCH) was added. The temperature was increased to 60° C. during 30 minutes and was kept there for 20 hours. Finally, the temperature was decreased to 20° C. and the concentration of unreacted VCH in the oil/catalyst mixture was analysed and was found to be 120 ppm weight.

Component (A) was produced in a Borstar pilot plant with a prepolymerization reactor, one slurry loop reactor and two gas phase reactors.

The solid catalyst was used in all cases along with triethyl-aluminium (TEAL) as cocatalyst and dicyclo-pentyl-dimethoxysilane (D-donor) as donor. The aluminium to donor ratio was 5 mol/mol, the TEAL/Ti-ratio was 90 mol/mol.

Polymerization data is shown in Table 1.

TABLE 1

| Polymerization data for Component (A) | | |
|---|---|---|
| | Unit | IE1 |
| Prepolymerization | | |
| Temperature | ° C. | 30 |
| TEAL/Ti ratio | mol/mol | 173 |
| TEAL/Donor ratio | mol/mol | 8.0 |
| Loop reactor | | |
| Temperature | ° C. | 80 |
| Split | wt % | 39 |
| H2/C3 | mol/kmol | 0.4 |

TABLE 1-continued

Polymerization data for Component (A)

|  | Unit | IE1 |
| --- | --- | --- |
| XCS | wt % | 2.4 |
| MFR | g/10 min | 2.4 |
| GPR 1 | | |
| Temperature | ° C. | 80 |
| Split | wt % | 50 |
| H2/C3 | mol/kmol | 7 |
| XCS | wt % | 1.7 |
| MFR$_M$ | g/10 min | 2.4 |
| GPR 2 | | |
| Temperature | ° C. | 75 |
| Split | wt % | 11 |
| C2/C3 | mol/kmol | 223 |
| H2/C2 | mol/kmol | 551 |
| C2 total | wt % | 4.27 |
| XCS | wt % | 15.0 |
| C2(XCS) | wt % | 26.0 |
| IV(XCS) | dl/g | 1.64 |
| MFR$_T$ | g/10 min | 3.0 |

Component (A) was stabilized by melt mixing on a co-rotating twin-screw extruder at 200-230° C. with 0.2 wt % of Irganox B225 (1:1-blend of Irganox 1010 (Pentaerythrityltetrakis(3-(3′,5′-di-tert.butyl-4-hydroxytoluyl)-propionate, CAS-no. 6683-19-8, and tris (2,4-di-t-butylphenyl) phosphate) phosphite), CAS-no. 31570-04-4, of BASF AG, Germany) and 0.1 wt % calcium stearate (CAS-no. 1592-23-0, commercially available from Faci, Italy).

TABLE 2 properties of component (A)

| Final product | IE1 |
| --- | --- |
| MFR2 [g/10 min] total | 3.0 |
| C2 content [wt %] total | 4.2 |
| XCS [wt %] | 14.0 |
| C2 of XCS [wt %] | 27.0 |
| Intrinsic viscosity of XCS [dl/g] | 1.9 |
| Tm (DSC) [° C.] | 167 |
| Tc (DSC) [° C.] | 128 |

Component (B)

Catalyst: Synthesis of Metallocene MC-1

4-Bromo-2,6-Dimethylaniline

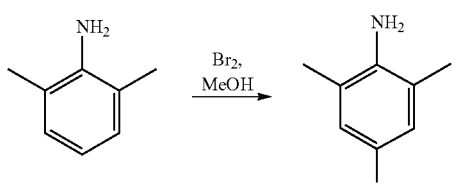

159.8 g (1.0 mol) of bromine was slowly (over 2 h) added to a stirred solution of 121.2 g (1.0 mol) of 2,6-dimethylaniline in 500 ml of methanol. The resulting dark-red solution was stirred overnight at room temperature, then poured into a cold solution of 140 g (2.5 mol) of potassium hydroxide in 1100 ml of water. The organic layer was separated, and the aqueous one was extracted with 500 ml of diethyl ether. The combined organic extract was washed with 1000 ml of water, dried over $K_2CO_3$, and evaporated in vacuum to give 202.1 g of 4-bromo-2,6-dimethylaniline (purity ca. 90%) as dark-red oil which crystallized upon standing at room temperature. This material was further used without additional purification.

$^1$H NMR (CDCl$_3$): δ 7.04 (s, 2H), 3.53 (br.s, 2H), 2.13 (s, 6H).

1-Bromo-3,5-dimethylbenzene

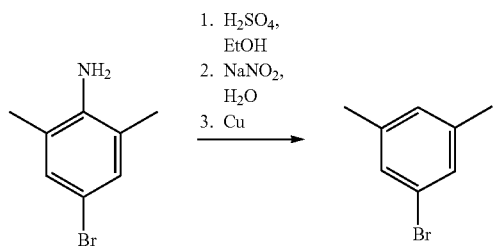

97 ml (1.82 mol) of 96% sulfuric acid was added dropwise to a solution of 134.7 g (ca. 673 mmol) of 4-bromo-2,6-dimethylaniline (prepared above, purity ca. 90%) in 1400 ml of 95% ethanol cooled to −10° C., at a such a rate to maintain the reaction temperature below 7° C. After the addition was complete, the solution was stirred at room temperature for 1 h. Then, the reaction mixture was cooled in an ice-bath, and a solution of 72.5 g (1.05 mol) of sodium nitrite in 150 ml of water was added dropwise over ca. 1 h. The formed solution was stirred at the same temperature for 30 min. Then the cooling bath was removed, and 18 g of copper powder was added. Upon completion of the rapid evolution of nitrogen additional portions (ca. 5 g each, ca.50 g in total) of copper powder were added with 10 min intervals until gas evolution ceased completely. The reaction mixture was stirred at room temperature overnight, then filtered through a glass frit (G3), diluted with two-fold volume of water, and the crude product was extracted with 4×150 ml of dichloromethane. The combined extract was dried over $K_2CO_3$, evaporated to dryness, and then distilled in vacuum (b.p. 60-63° C./5 mm Hg) to give a yellowish liquid. This product was additionally purified by flash-chromatography on silica gel 60 (40-63 μm; eluent: hexane) and distilled once again (b.p. 51-52° C./3 mm Hg) to give 63.5 g (51%) of 1-bromo-3,5-dimethylbenzene as a colorless liquid.

$^1$H NMR (CDCl$_3$): δ 7.12 (s, 2H), 6.89 (s, 1H), 2.27 (s, 6H). $^{13}$C{$^1$H} NMR (CDCl$_3$): δ 139.81, 129.03, 128.61, 122.04, 20.99.

(3,5-Dimethylphenyl)boronic acid

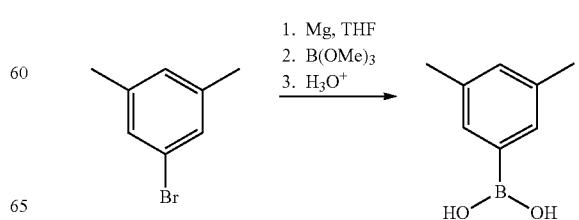

A solution of 3,5-dimethylphenylmagnesium bromide obtained from a solution of 190.3 g (1.03 mol) of 1-bromo-3,5-dimethylbenzene in 1000 ml of THF and 32 g (1.32 mol, 28% excess) of magnesium turnings was cooled to −78° C., and 104 g (1.0 mol) of trimethylborate was added in one portion. The resulting heterogeneous mixture was stirred overnight at room temperature. The boronic ester was hydrolyzed by careful addition of 1200 ml of 2 M HCl. 500 ml of diethyl ether was added, the organic layer was separated, and the aqueous layer was additionally extracted with 2×500 ml of diethyl ether. The combined organic extract was dried over $Na_2SO_4$ and then evaporated to dryness to give white mass. The latter was triturated with 200 ml of n-hexane, filtered through glass frit (G3), and the precipitate was dried in vacuo. This procedure gave 114.6 g (74%) of (3,5-dimethylphenyl)boronic acid.

Anal. calc. for $C_8H_{11}BO_2$: C, 64.06; H, 7.39. Found: C, 64.38; H, 7.72.

$^1$H NMR (DMSO-$d_6$): δ 7.38 (s, 2H), 7.00 (s, 1H), 3.44 (very br.s, 2H), 2.24 (s, 6H).

2-methyl-4-(3,5-dimethylphenyl)-5-methoxy-6-tert-butyl-indan-1-one

A mixture of 49.14 g (157.9 mmol) of 2-methyl-4-bromo-5-methoxy-6-tert-butylindan-1-one, 29.6 g (197.4 mmol, 1.25 eq.) of (3,5-dimethylphenyl)boronic acid, 45.2 g (427 mmol) of $Na_2CO_3$, 1.87 g (8.3 mmol, 5 mol. %) of $Pd(OAc)_2$, 4.36 g (16.6 mmol, 10 mol. %) of $PPh_3$, 200 ml of water, and 500 ml of 1,2-dimethoxyethane was refluxed for 6.5 h. DME was evaporated on a rotary evaporator, 600 ml of water and 700 ml of dichloromethane were added to the residue. The organic layer was separated, and the aqueous one was additionally extracted with 200 ml of dichloromethane. The combined extract was dried over $K_2CO_3$ and then evaporated to dryness to give a black oil. The crude product was purified by flash chromatography on silica gel 60 (40-63 μm, hexane-dichloromethane=1:1, vol., then, 1:3, vol.) to give 48.43 g (91%) of 2-methyl-4-(3,5-dimethylphenyl)-5-methoxy-6-tert-butylindan-1-one as a brownish oil.

Anal. calc. for $C_{23}H_{28}O_2$: C, 82.10; H, 8.39. Found: C, 82.39; H, 8.52.

$^1$H NMR (CDCl$_3$): δ 7.73 (s, 1H), 7.02 (s, 3H), 7.01 (s, 3H), 3.32 (s, 3H), 3.13 (dd, J=17.5 Hz, J=7.8 Hz, 1H), 2.68-2.57 (m, 1H), 2.44 (dd, J=17.5 Hz, J=3.9 Hz), 2.36 (s, 6H), 1.42 (s, 9H), 1.25 (d, J=7.5 Hz, 3H). $^{13}$C{$^1$H} NMR (CDCl$_3$): δ 208.90, 163.50, 152.90, 143.32, 138.08, 136.26, 132.68, 130.84, 129.08, 127.18, 121.30, 60.52, 42.17, 35.37, 34.34, 30.52, 21.38, 16.40.

2-methyl-5-tert-butyl-6-methoxy-7-(3,5-dimethylphenyl)-1H-indene

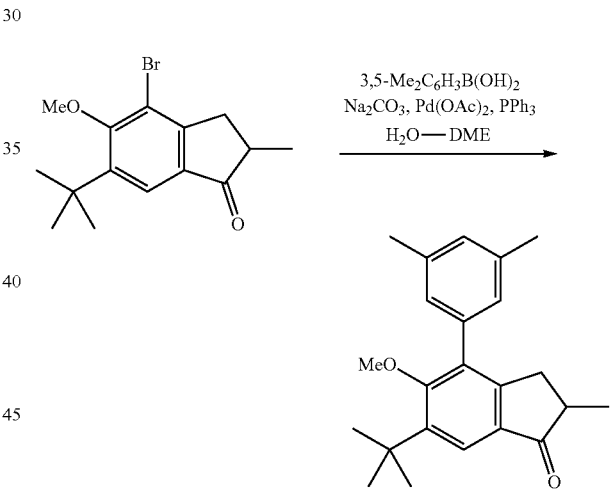

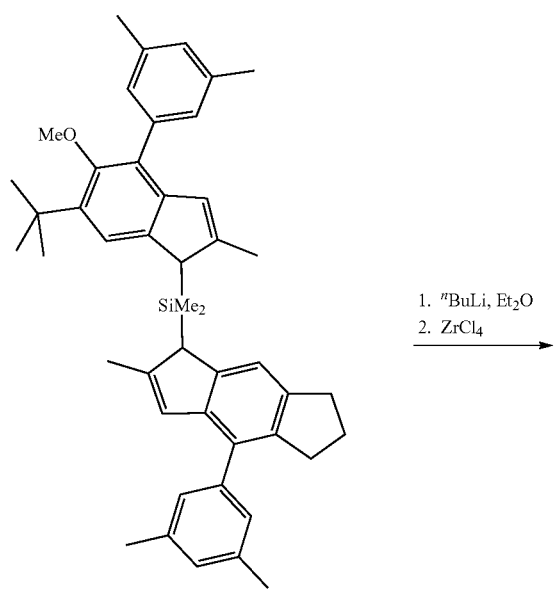

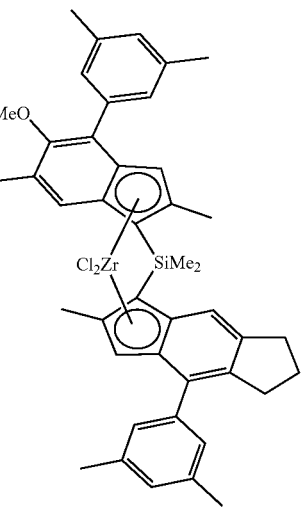

8.2 g (217 mmol) of $NaBH_4$ was added to a solution of 48.43 g (143.9 mmol) of 2-methyl-4-(3,5-dimethylphenyl)-5-methoxy-6-tert-butylindan-1-one in 300 ml of THF cooled to 5° C. Then, 150 ml of methanol was added dropwise to this mixture by vigorous stirring for ca. 7 h at 5° C. The resulting mixture was evaporated to dryness, and the residue was partitioned between 500 ml of dichloromethane and 500 ml of 2 M HCl. The organic layer was separated, the aqueous layer was additionally extracted with 100 ml of dichloromethane. The combined organic extract was evaporated to dryness to give a slightly yellowish oil. To a solution of this oil in 600 ml of toluene 400 mg of TsOH was added, this mixture was refluxed with Dean-Stark head for 10 min and then cooled to room temperature using a water bath. The formed solution was washed by 10% $Na_2CO_3$, the organic layer was separated, the aqueous layer was extracted with 150 ml of dichloromethane. The combined organic extract was dried over $K_2CO_3$ and then passed through a short layer of silica gel 60 (40-63 μm). The silica gel layer was additionally washed by 100 ml of dichloromethane. The combined organic elute was evaporated to dryness, and the resulting oil was dried in vacuum at elevated temperature. This procedure gave 45.34 g (98%) of 2-methyl-5-tert-butyl-6-methoxy-7-(3,5-dimethylphenyl)-1H-indene which was used without additional purification.

Anal. calc. for $C_{23}H_{28}O$: C, 86.20; H, 8.81. Found: C, 86.29; H, 9.07.

$^1$H NMR (CDCl$_3$): δ 7.20 (s, 1H), 7.08 (br.s, 1H), 6.98 (br.s, 1H), 6.42 (m, 1H), 3.25 (s, 3H), 3.11 (s, 2H), 2.36 (s, 6H), 2.06 (s, 3H), 1.43 (s, 9H). $^{13}$C{$^1$H} NMR (CDCl$_3$): δ 154.20, 145.22, 141.78, 140.82, 140.64, 138.30, 137.64, 131.80, 128.44, 127.18, 126.85, 116.98, 60.65, 42.80, 35.12, 31.01, 21.41, 16.65.

[2-methyl-4-(3,5-dimethylphenyl)-5-methoxy-6-tert-Butyl-1H-inden-1-yl](chloro)dimethylsilane

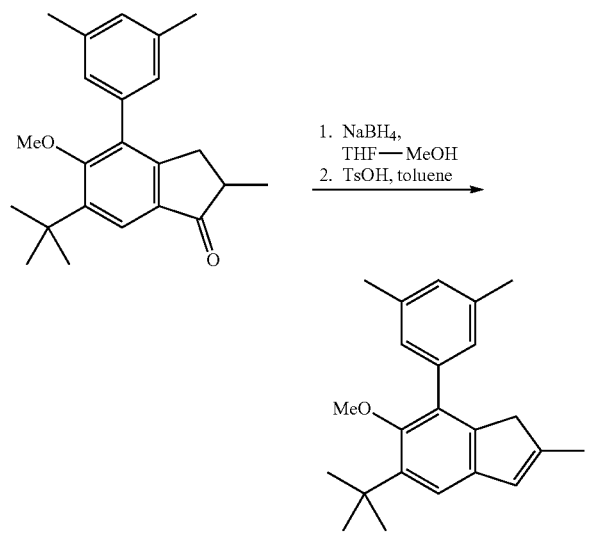

To a solution of 9.0 g (28.08 mmol) of 2-methyl-5-tert-butyl-6-methoxy-7-(3,5-dimethylphenyl)-1H-indene in 150 ml of ether, cooled to −50° C., 11.6 ml (28.19 mmol) of 2.43 M $^n$BuLi in hexanes was added in one portion. The resulting mixture was stirred for 6 h at room temperature, then the obtained yellow suspension was cooled to −60° C., and 18.1 g (140.3 mmol, 5 equiv.) of dichlorodimethylsilane was added in one portion. The obtained solution was stirred overnight at room temperature and then filtered through a glass frit (G3). The filtrate was evaporated to dryness to give [2-methyl-4-(3,5-dimethylphenyl)-5-methoxy-6-tert-Butyl-1H-inden-1-yl](chloro)dimethylsilane as a slightly yellowish oil which was further used without an additional purification.

$^1$H NMR (CDCl$_3$): δ 7.38 (s, 1H), 7.08 (s, 2H), 6.98 (s, 1H), 6.43 (s, 1H), 3.53 (s, 1H), 3.25 (s, 3H), 2.37 (s, 6H), 2.19 (s, 3H), 1.43 (s, 9H), 0.43 (s, 3H), 0.17 (s, 3H). 13C{$^1$H} NMR (CDCl$_3$): δ 155.78, 145.88, 143.73, 137.98, 137.56, 137.49, 136.74, 128.32, 127.86, 127.55, 126.64, 120.86, 60.46, 49.99, 35.15, 31.16, 21.41, 17.55, 1.11, −0.58.

1-methoxy-2-methyl-4-(3,5-Dimethylphenyl)-1,2,3,5,6,7-hexahydro-s-indacene

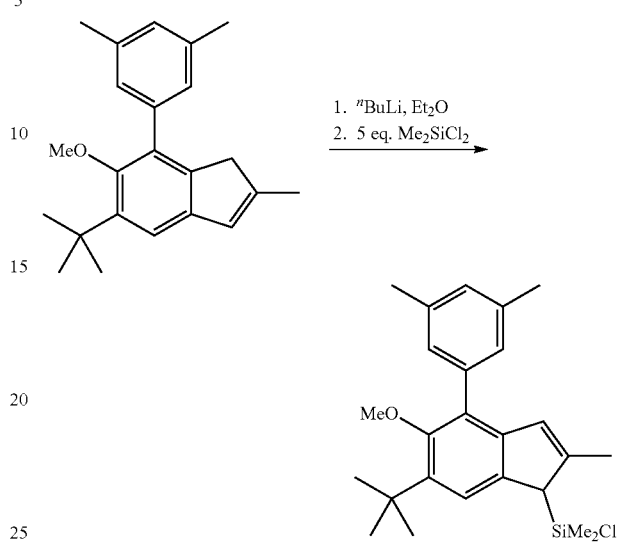

To a mixture of 2.0 g (2.56 mmol, 1.8 mol. %) of NiCl$_2$(PPh$_3$)IPr and 40.0 g (142.3 mmol) of 4-bromo-1-methoxy-2-methyl-1,2,3,5,6,7-hexahydro-s-indacene, 200 ml (200 mmol, 1.4 eq) of 3,5-dimethylphenylmagnesium bromide 1.0 M in THF was added. The resulting solution was refluxed for 3 h, then cooled to room temperature, and 400 ml of water followed by 500 ml of 1.0 M HCl solution were added. Further on, this mixture was extracted with 600 ml of dichloromethane, the organic layer was separated, and the aqueous layer was extracted with 2×100 ml of dichloromethane. The combined organic extract was evaporated to dryness to give a slightly greenish oil. The product was isolated by flash-chromatography on silica gel 60 (40-63 μm; eluent: hexanes-dichloromethane=2:1, vol., then 1:2, vol.). This procedure gave 43.02 g (99%) of 1-methoxy-2-methyl-4-(3,5-dimethylphenyl)-1,2,3,5,6,7-hexahydro-s-indacene as a colorless thick oil as a mixture of two diastereoisomers.

Anal. calc. for $C_{22}H_{26}O$: C, 86.23; H, 8.55. Found: C, 86.07; H, 8.82.

$^1$H NMR (CDCl$_3$), Syn-isomer: δ 7.21 (s, 1H), 6.94 (br.s, 1H), 6.90 (br.s, 2H), 4.48 (d, J=5.5 Hz, 1H), 3.43 (s, 3H), 2.94 (t, J=7.5 Hz, 2H), 2.87-2.65 (m, 3H), 2.63-2.48 (m, 2H), 2.33 (s, 6H), 2.02 (quin, J=7.5 Hz, 2H), 1.07 (d, J=6.7 Hz, 3H); Anti-isomer: δ 7.22 (s, 1H), 6.94 (br.s, 1H), 6.89 (br.s, 2H), 4.38 (d, J=4.0 Hz, 1H), 3.48 (s, 3H), 3.06 (dd, J=16.0 Hz, J=7.5 Hz, 1H), 2.93 (t, J=7.3 Hz, 2H), 2.75 (td, J=7.3 Hz, J=3.2 Hz, 2H), 2.51-2.40 (m, 1H), 2.34 (s, 6H), 2.25 (dd, J=16.0 Hz, J=5.0 Hz, 1H), 2.01 (quin, J=7.3 Hz, 2H), 1.11 (d, J=7.1 Hz, 3H). $^{13}$C{$^1$H} NMR (CDCl$_3$), Syn-isomer: δ 142.69, 142.49, 141.43, 139.97, 139.80, 137.40, 135.46, 128.34, 126.73, 120.09, 86.29, 56.76, 39.43, 37.59, 33.11, 32.37, 25.92, 21.41, 13.73; Anti-isomer: δ 143.11, 142.72, 140.76, 139.72, 139.16, 137.37, 135.43, 128.29, 126.60, 119.98, 91.53, 56.45, 40.06, 37.65, 33.03, 32.24, 25.88, 21.36, 19.36.

4-(3,5-Dimethylphenyl)-6-methyl-1,2,3,5-tetrahydro-s-indacene

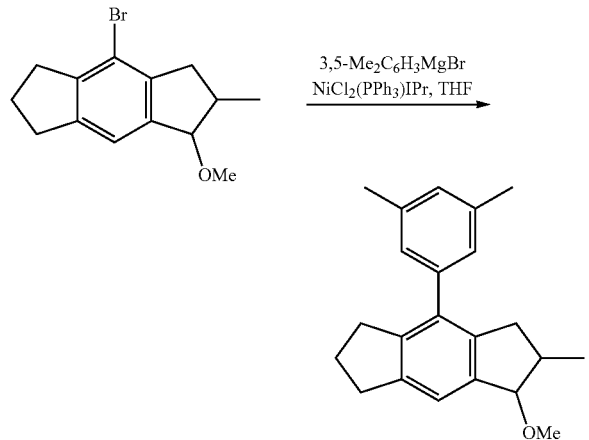

To the solution of 43.02 g (140.4 mmol) 1-methoxy-2-methyl-4-(3,5-dimethylphenyl)-1,2,3,5,6,7-hexahydro-s-indacene in 600 ml of toluene, 200 mg of TsOH was added, and the resulting solution was refluxed using Dean-Stark head for 15 min. After cooling to room temperature the reaction mixture was washed with 200 ml of 10% NaHCO$_3$. The organic layer was separated, and the aqueous layer was additionally extracted with 300 ml of dichloromethane. The combined organic extract was evaporated to dryness to give light orange oil. The product was isolated by flash-chromatography on silica gel 60 (40-63 μm; eluent: hexanes, then hexanes-dichloromethane=10:1, vol.). This procedure gave 35.66 g (93%) of 4-(3,5-dimethylphenyl)-6-methyl-1,2,3,5-tetrahydro-s-indacene as a slightly yellowish oil which spontaneously solidified to form a white mass.

Anal. calc. for C$_{21}$H$_{22}$: C, 91.92; H, 8.08. Found: C, 91.78; H, 8.25.

$^1$H NMR (CDCl$_3$): δ 7.09 (s, 1H), 6.98 (br.s, 2H), 6.96 (br.s, 1H), 6.44 (m, 1H), 3.14 (s, 2H), 2.95 (t, J=7.3 Hz, 2H), 2.76 (t, J=7.3 Hz, 2H), 2.35 (s, 6H), 2.07 (s, 3H), 2.02 (quin, J=7.3 Hz, 2H). $^{13}$C{$^1$H} NMR (CDCl$_3$): δ 145.46, 144.71, 142.81, 140.17, 139.80, 137.81, 137.50, 134.33, 128.35, 127.03, 126.48, 114.83, 42.00, 33.23, 32.00, 25.87, 21.38, 16.74.

[2-methyl-4-(3,5-dimethylphenyl)-5-methoxy-6-tert-Butyl-1H-inden-1-yl][2-methyl-4-(3,5-dimethylphenyl)-1,5,6,7-tetrahydro-s-indacen-1-yl]dimethylsilane

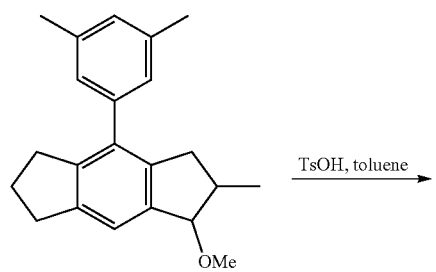

To a solution of 7.71 g (28.1 mmol) of 4-(3,5-dimethylphenyl)-6-methyl-1,2,3,5-tetrahydro-s-indacene in a mixture of 150 ml of ether and 20 ml of THF 11.6 ml (28.19 mmol) of 2.43 M $^n$BuLi in hexanes was added in one portion at −50° C. This mixture was stirred for 6 h at room temperature, then the resulting orange solution was cooled to −50° C., and 150 mg of CuCN was added. The obtained mixture was stirred for 0.5 h at −25° C., then a solution of [2-methyl-4-(3,5-dimethylphenyl)-5-methoxy-6-tert-butyl-1H-inden-1-yl](chloro)dimethylsilane (prepared above, ca. 28.08 mmol) in 150 ml of ether was added in one portion. This mixture was stirred overnight at room temperature, then filtered through a pad of silica gel 60 (40-63 μm), which was additionally washed by 2×50 ml of dichloromethane. The combined filtrate was evaporated under reduced pressure to give a yellow oil. The product was isolated by flash-chromatography on silica gel 60 (40-63 μm; eluent: hexanes-dichloromethane=10:1, vol., then 5:1, vol.). This procedure gave 11.95 g (65%) of [2-methyl-4-(3,5-dimethylphenyl)-5-methoxy-6-tert-Butyl-1H-inden-1-yl][2-methyl-4-(3,5-dimethylphenyl)-1,5,6,7-tetrahydro-s-indacen-1-yl]dimethylsilane (as ca. 1:1 mixture of stereoisomers) as a yellowish glassy solid.

Anal. calc. for C$_{46}$H$_{54}$OSi: C, 84.87; H, 8.36. Found: C, 85.12; H, 8.59.

$^1$H NMR (CDCl$_3$): δ 7.48 and 7.33 (2s, sum 1H), 7.26-7.18 (m, 1H), 7.16-7.07 (m, 2H), 7.04-6.95 (m, 4H), 6.51 and 6.45 (2s, sum 2H), 3.69 and 3.65 (2s, sum 2H), 3.28 and 3.26 (2s, sum 3H), 3.01-2.74 (m, 4H), 2.38 ad 2.37 (2s, sum 12H), 2.20 and 2.15 (2s, sum 6H), 2.09-1.97 (m, 2H), 1.43 and 1.42 (2s, sum 9H), −0.17, −0.18, −0.19 and −0.24 (4s, sum 6H). $^{13}$C{$^1$H} NMR (CDCl$_3$): δ 155.29, 147.45, 147.39, 145.99, 145.75, 143.93, 143.90, 143.72, 143.69, 142.06, 142.01, 140.08, 140.06, 139.46, 139.37, 139.26, 139.03, 139.00, 138.24, 137.50, 137.34, 137.07, 136.99, 130.39, 128.23, 128.14, 127.92, 127.50, 127.46, 127.26, 126.12, 126.05, 125.99, 125.94, 120.55, 120.51, 118.46, 118.27, 60.49, 47.33, 46.86, 46.76, 35.14, 33.33, 33.28, 32.18, 31.26, 31.21, 25.95, 25.91, 21.44, 17.96, 17.88, −5.27, −5.39, −5.50,-5.82.

Anti-dimethylsilanediyl[2-methyl-4-(3,5-dimethylphenyl)-5-methoxy-6-tert-butylinden-1-yl][2-methyl-4-(3,5-dimethylphenyl)-1,5,6,7-tetrahydro-s-indacen-1-yl]zirconium dichloride 1. $^n$BuLi, Et$_2$O—THF
2. CuCN
3. 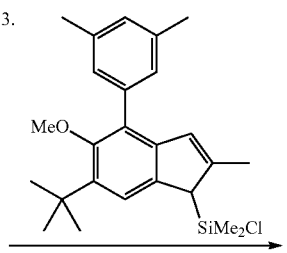

-continued

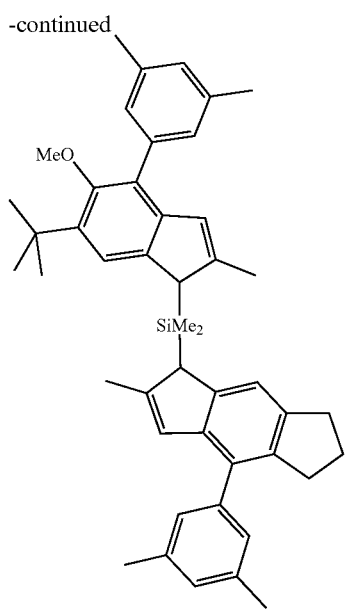

To a solution of 11.95 g (18.36 mol) of [2-methyl-4-(3,5-dimethylphenyl)-5-methoxy-6-tert-butyl-1H-inden-1-yl][2-methyl-4-(3,5-dimethylphenyl)-1,5,6,7-tetrahydro-s-indacen-1-yl]dimethylsilane (prepared above) in 200 ml of ether, cooled to −50° C., 15.1 ml (35.7 mmol) of 2.43 M ″BuLi in hexanes was added in one portion. This mixture was stirred for 3 h at room temperature, then the resulting red solution was cooled to −78° C., and 4.28 g (18.37 mmol) of ZrCl₄ was added. The reaction mixture was stirred for 24 h at room temperature to give light red solution with orange precipitate. This mixture was evaporated to dryness. The residue was treated with 250 ml of hot toluene, and the formed suspension was filtered through glass frit (G4). The filtrate was evaporated to 40 ml. Red powder precipitated from this solution overnight at room temperature was collected, washed with 10 ml of cold toluene, and dried in vacuum. This procedure gave 0.6 g of syn-zirconocene. The mother liquor was evaporated to ca. 35 ml, and 15 ml of n-hexane was added to the warm solution. The red powder precipitated from this solution overnight at room temperature was collected and dried in vacuum. This procedure gave 3.49 g syn-zirconocene. The mother liquor was evaporated to ca. 20 ml, and 30 ml of n-hexane was added to the warm solution. The yellow powder precipitated from this solution overnight at room temperature was collected and dried in vacuum. This procedure gave 4.76 g anti-zirconocene as a solvate with toluene (×0.6 toluene) contaminated with ca. 2% of syn-isomer. Thus, the total yield of syn- and anti-zirconocenes isolated in this synthesis was 8.85 g (59%).

Anti-dimethylsilanediyl[2-methyl-4-(3,5-dimethylphenyl)-5-methoxy-6-tert-butylinden-1-yl][2-methyl-4-(3,5-dimethylphenyl)-1,5,6,7-tetrahydro-s-indacen-1-yl]zirconium dichloride Anal. calc. for $C_{46}H_{52}Cl_2OSiZr \times 0.6C_7H_8$: C, 69.59; H, 6.61. Found: C, 69.74; H, 6.68.
$^1H$ NMR (CDCl₃): δ 7.47 (s, 1H), 7.40 (s, 1H), 7.37-7.03 (m, 4H), 6.95 (s, 1H), 6.71 (s, 1H), 6.55 (s, 1H), 3.43 (s, 3H), 3.03-2.96 (m, 2H), 2.96-2.87 (m, 1H), 2.87-2.76 (m, 1H), 2.34 and 2.33 (2s, sum 12H), 2.19 and 2.18 (2s, sum 6H), 2.06-1.94 (m, 2H), 1.38 (s, 9H), 1.28 (s, 3H), 1.27 (s, 3H). $^{13}C\{^1H\}$ NMR (CDCl₃): δ 159.73, 144.59, 143.99, 143.00, 138.26, 137.84, 137.59, 136.80, 135.35, 133.85, 133.63, 132.95, 132.52, 128.90, 128.80, 127.40, 126.95, 126.87, 126.65, 122.89, 121.61, 121.53, 120.82, 117.98, 81.77, 81.31, 62.62, 35.73, 33.20, 32.12, 30.37, 26.49, 21.47, 21.38, 18.40, 18.26, 2.64, 2.54.

Syn-dimethylsilanediyl[2-methyl-4-(3,5-dimethylphenyl)-5-methoxy-6-tert-butylinden-1-yl][2-methyl-4-(3,5-dimethylphenyl)-1,5,6,7-tetrahydro-s-indacen-1-yl]zirconium dichloride Anal. calc. for $C_{46}H_{52}Cl_2OSiZr$: C, 68.11; H, 6.46. Found: C, 68.37; H, 6.65.
$^1H$ NMR (CDCl₃): δ 7.51 (s, 1H), 7.39 (s, 1H), 7.36-6.99 (m, 4H), 6.95 (s, 2H), 6.60 (s, 1H), 6.44 (s, 1H), 3.27 (s, 3H), 2.91-2.75 (m, 4H), 2.38 and 2.34 (2s, sum 18H), 1.99-1.87 (m, 1H), 1.87-1.74 (m, 1H), 1.42 (s, 3H), 1.36 (s, 9H), 1.19 (s, 3H). $^{13}C\{^1H\}$ NMR (CDCl₃,): δ 158.74, 143.41, 142.84, 142.31, 138.30, 137.77, 137.55, 136.85, 135.87, 135.73, 134.99, 134.75, 131.64, 128.83, 128.76, 127.97, 127.32, 126.82, 126.22, 123.91, 121.35, 121.02, 120.85, 118.56, 83.47, 83.08, 62.32, 35.53, 33.33, 31.96, 30.33, 26.53, 21.45 (two resonances), 18.56, 18.43, 2.93, 2.65.

Catalyst: Synthesis of Catalyst:

1H,1H-Perfluoro(2-methyl-3-oxahexan-1-ol) (CAS 26537-88-2) purchased from Unimatec, dried over activated molecular sieves (2 times) and degassed by argon bubbling prior to use was used as surfactante.

Inside the glovebox, 28.8 mg of dry and degassed surfactant (in 0.2 mL toluene) were added dropwise to 5 mL of MAO. The solution was left under stirring for 10 minutes. Then, 98.7 mg of MC-1 were added to the MAO/surfactante solution. After 60 minutes stirring, 106.0 mg of trityl tetrakis (pentafluorophenyl)borate were added.

After 60 minutes stirring, the surfactant-MAO-metallocene-borate solution was successively added into a 50 mL emulsification glass reactor containing 40 mL of PFC at −10° C. and equipped with an overhead stirrer (stirring speed=600 rpm). A red emulsion formed immediately and was stirred during 15 minutes at −10° C./600 rpm. Then the emulsion was transferred via a 2/4 teflon tube to 100 mL of hot PFC at 90° C., and stirred at 600 rpm until the transfer is completed, then the speed was reduced to 300 rpm. After 15 minutes stirring, the oil bath was removed and the stirrer turned off. The catalyst was left to settle up on top of the PFC and after 35 minutes the solvent was siphoned off. The catalyst was left to settle up on top of the PFC and after 35 minutes the solvent was siphoned off. The remaining catalyst was dried during 2 hours at 50° C. under argon flow. 0.60 g of a red free flowing powder was obtained.

Off-Line Prepolymerization Procedure

The above produced catalyst was off-line prepolymerized according to the following procedure: The catalyst was pre-polymerized according to the following procedure: Off-line pre-polymerization experiment was done in a 125 mL pressure reactor equipped with gas-feeding lines and an overhead stirrer. Dry and degassed perfluoro-1.3-dimethyl-cyclohexane (15 cm3) and the desired amount of the catalyst to be pre-polymerized were loaded into the reactor inside a glove box and the reactor was sealed. The reactor was then taken out from the glove box and placed inside a water cooled bath kept at 25° C. The overhead stirrer and the feeding lines were connected and stirring speed set to 450 rpm. The experiment was started by opening the propylene feed into the reactor. The total pressure in the reactor was raised to about 5 barg and held constant by propylene feed via mass flow controller until the target degree of polymerization was reached. The reaction was stopped by flashing the volatile components. Inside glove box, the reactor was opened and the content poured into a glass vessel. The perfluoro-1,3-dimethylcyclohexane was evaporated until a constant weight was obtained to yield the pre-polymerized catalyst.

TABLE 3

Off-line prepolymerization.

| Metallocene | Catalyst amount (mg) | Prepolymerization Degree (wt %/wt %) |
|---|---|---|
| MC-1 | 435.6 | 3.30 |

Polymerization Examples for Component B

A stirred autoclave (equipped with a ribbon stirrer) with a total volume of 21.2 $dm^3$ containing 0.2 bar-g propylene (quality 2.3; purified via columns filled with PolyMax301 T-4427B (60° C.; Cu/CuO), MS13X-APG 1/16 and Selexsorb COS) is filled with additional 4.45 kg propylene and a chosen amount of 1-hexene. The amount of triethylaluminium was 0.4 ml of TEA. After addition of triethylaluminium (0.62 molar solution in n-heptane) using a stream of 250 g propylene. The solution is stirred at 20° C. and 250 rpm for at least 20 min. Afterwards the reactor is brought up to the set pre-polymerization temperature (30° C.) and the catalyst is injected.

The solid, pre-polymerized catalyst of above is loaded into a 5 ml stainless steel vial inside the glove box. The vial is attached to the autoclave, then a second 5 ml vial containing 4 ml n-heptane and pressurized with 10 bars of N2 is added on top. The chosen amount of H2 is dosed into the reactor via flow controller. The chosen amount of hexene and H2 depends on the desired end-properties of component (B) and can be easily adjusted by an art skilled person.

The valve between the two vials is opened and the solid catalyst is contacted with heptane under N2 pressure for 2 s, and then flushed into the reactor with 250 g propylene. Stirring speed is held at 250 rpm and pre-polymerization is run for the set time. Now the polymerization temperature is increased to 75° C. The reactor temperature is held constant throughout the polymerization. The polymerization time is measured starting when the temperature is 2° C. below the set polymerization temperature. When the polymerization time 60 min has lapsed, the reaction is stopped by injecting 5 ml ethanol, cooling the reactor and flashing the volatile components. After flushing the reactor 3 times with N2 and one vacuum/N2 cycle, the product is taken out and dried overnight in a hood.

A propylene-hexene copolymer B-1 has been prepared with the following base properties:

| | $MFR_2$ [g/10 min] | C6 [wt %] | XCS [wt %] | Tm [° C.] | Mw [kg/mol] | Mw/Mn [—] |
|---|---|---|---|---|---|---|
| Component B-1 | 16 | 3.6 | 0.5 | 132 | 220 | 3.6 |

Component (B) was stabilized in the same manner as component (A) by melt mixing on a co-rotating twin-screw extruder at 200-230° C. with 0.2 wt % of Irganox B225 (1:1-blend of Irganox 1010 (Pentaerythrityltetrakis(3-(3',5'-di-tert.butyl-4-hydroxytoluyl)-propionate, CAS-no. 6683-19-8, and tris (2,4-di-t-butylphenyl) phosphate) phosphite), CAS-no. 31570-04-4, of BASF AG, Germany) and 0.1 wt % calcium stearate (CAS-no. 1592-23-0, commercially available from Faci, Italy).

For Comparative Examples CE1 and CE2 the following blend partners were used for Component (A):

CE1: HF700SA is a polypropylene homopolymer commercially available from Borealis AG, Austria, with an $MFR_2$ (230° C.; 2.16 kg) is 21.0 g/10 min. The density is 905 kg/m³ and the melting point in DSC 165° C. (Component B-2)

CE2: RF365MO is a polypropylene-ethylene random copolymer commercially available from Borealis AG, Austria, having an $MFR_2$ (230° C.; 2.16 kg) of 20 g/10 min, an ethylene content of 3.1 wt % and a melting point in DSC of 151° C. (Component B-3)

Component (A) and Components (B) were compounded in a co-rotating twin-screw extruder Coperion ZSK 18 at 220° C. without further additivation.

TABLE 4

Inventive and comparative polymer blends and properties

| | | CE2 | CE1 | IE1 |
|---|---|---|---|---|
| Component A | wt % | 90.0 | 90.0 | 90.0 |
| Component B-1 | wt % | | | 10.0 |
| Component B-2 | wt % | | 10.0 | |
| Component B-3 | wt % | 10.0 | | |
| $MFR_2$ | g/10 min | 3.6 | 3.6 | 3.6 |
| Tc | ° C. | 128 | 129 | 128 |
| Tm | ° C. | 167 | 168 | 166 |
| XCS | wt % | 14.1 | 13.6 | 13.7 |
| C6 FDA | wt % | 1.81 | 1.47 | 1.45 |
| Flexural Modulus (MD) | MPa | 1351 | 1392 | 1335 |
| NIS (23° C.) | $kJ/m^2$ | 38 | 33 | 36 |
| NIS (−20° C.) | $kJ/m^2$ | 2.0 | 2.9 | 2.1 |

The inventive and comparative polymer blends were converted to monolayer cast films with a thickness of 50 μm on a PM30 cast line (type laboratory extruder provided by Plastik Maschinenbau GmbH., Germany). The equipment consists of an extruder, chill roll with air knife and a winder.

A PP 3-zone screw with a diameter of 30 mm, 25D length, 200 mm die, die gap 0.5 mm is applied in combination with a coat-hanger slit die assembly.

The extrusion parameters were as follows:

Extruder temperature profile: 220° C./240° C./250° C./260° C./260° C. (Melt temperature 250° C.; melt pressure 61 bar)

Extruder speed: 50 rpm

Chill roll temperature: 20° C.

take-off speed: 10.2 m/min

The films were furthermore steam sterilized.

Steam sterilization was performed in a Systec D series machine (Systec Inc., USA). The samples were heated up at a heating rate of 5° C./min starting from 23° C. After having been kept for 30 min at 121° C., they were removed immediately from the steam sterilizer and stored at room temperature until being processed further.

In Table 5 the optical parameters (haze before sterilization, b.s. and after sterilization a.s.) as well as tensile modulus (MD) measured on the 50 μm cast films can be seen.

TABLE 5

|  |  | CE2 | CE1 | IE1 |
|---|---|---|---|---|
| Tensile Modulus MD | MPa | 915 | 1007 | 1025 |
| Haze b.s. | % | 8 | 9 | 7 |
| Haze a.s. | % | 8 | 10 | 7 |
| Δ(Haze) | % | 0 | 11 | 0 |

From the above tables it can be clearly seen that the inventive polymer blends are characterised by an excellent balance between mechanical performance, optics and hexane solubles.

In comparison to a ZN-PP homo- or random copolymer the following advantages can be seen:
- C6 FDA: IE has the same level as ZN-PPH, but much lower than that for ZN-random copolymer
- Film mechanical properties: IE gives same stiffness/impact balance as the one with ZN-PPH, but much better than ZN-random copolymer
- Optics: Haze is lowest for IE, before and after sterilization, which is seen as an important benefit for this type of application.

The invention claimed is:

1. A polypropylene composition comprising a blend of:
   (A) 85.0 to 95.0 wt. % of a heterophasic propylene copolymer (HECO) comprising:
      (A-1) 80.0 to 90.0 wt. % of a matrix (M) that is a propylene homopolymer (H-PP) with an $MFR_2$ (230° C., 2.16 kg, ISO1133) of from 0.8-10.0 g/10 min and
      (A-2) 10.0 to 20.0 wt. % of an elastomeric propylene copolymer (EPC) dispersed in said matrix (M),
   wherein said heterophasic propylene copolymer has a xylene cold soluble (XCS) fraction having a C2 content of from 15.0 to 30.0 wt. % and an intrinsic viscosity (IV; determined according to DIN ISO 1628/1 in decalin at 135° C.) of from 1.2 to 2.6 dl/g;
   (B) 5.0 to 15.0 wt. % of a propylene-hexene random copolymer with a hexene content in the range of from 2.0 to 10.0 wt. % and an $MFR_2$ (230° C., 2.16 kg, ISO1133) in a range of from 1.0 to 20.0 g/10 min; and
   (C) optionally an alpha nucleating agent.

2. The polypropylene composition according to claim 1, wherein the composition has a total hexene content of from 0.1 to 1.5 wt. % and an $MFR_2$ (230° C., 2.16 kg, ISO1133) of from 1.0 to 15.0 g/10 min.

3. The polypropylene composition according to claim 1, wherein the composition has a hexane soluble value (C6FDA) of ≤3.0 wt. %.

4. The polypropylene composition according to claim 1, wherein the composition has a total hexene content of from 0.1 to 1.5 wt. % and a total ethylene content of from 1.5 to 6.2 wt. %.

5. The polypropylene composition according to claim 1, wherein the composition has:
   (i) a Flexural Modulus according to ISO 178 in a range of from 1000 to 1800 MPa,
   (ii) a Charpy notched impact strength NIS +23° C. according to ISO 179 in the range of from 25 to 75 $kJ/m^2$, and
   iii) a Charpy notched impact strength NIS −20° C. according to ISO 179 1eA in the range of from 1.5 to 5.0 $kJ/m^2$.

6. A polypropylene composition according to claim 1, wherein the composition has a haze according to ASTM D 1003-00 measured on a 1 mm thick injection molded specimen of ≤50.0%.

7. A process for the preparation of the polypropylene composition according to claim 1, the process comprising the steps of;
   (i) preparing a heterophasic propylene copolymer (HECO) (A) in the presence of a Ziegler-Natta catalyst;
   (ii) preparing a propylene-hexene random copolymer (B) by polymerizing propylene and hexene in the presence of a single site catalyst;
   (iii) mixing said heterophasic propylene copolymer (HECO) (A) with the propylene-hexene random copolymer (B) to obtain a mixture of (A) and (B); and
   (iv) extruding said mixture to obtain the blend of (A) and (B).

8. An article comprising the polypropylene composition according to claim 1 or the polypropylene composition prepared by the process according to claim 7.

9. The article according to claim 8, wherein the article is an unoriented film comprising more than 90% of the blend according to claim 1 or the blend prepared by the process according to claim 7, wherein the film is a cast film or a blown film.

10. The article according to claim 9, wherein the film has been subjected to a sterilization treatment.

11. The article according to claim 9, wherein the film a) before sterilization treatment has a haze (b.s.) determined on 50 μm cast film of below 10.0% and b) after sterilization treatment at 121° C. for 30 min has a haze (a.s.) value determined on 50 μm cast film of below 15.0.

12. The article according to claim 11, wherein the film has a Δ(haze) value, defined as Δ(haze)=(haze(a.s.)−haze(b.s.))/haze(b.s.)*100%, of below 10%.

13. The article according to claim 9, wherein the film has a tensile modulus in machine (MD) direction determined according to ISO 527-3 on a 50 μm cast film in the range of from 750 to 1500 MPa.

* * * * *